US012715804B2

(12) United States Patent
Bressler et al.

(10) Patent No.: US 12,715,804 B2
(45) Date of Patent: Aug. 25, 2026

(54) METHOD OF MANUFACTURING SHEETS OF GLASS WITH REDUCED TOTAL THICKNESS VARIATION

(71) Applicant: CORNING INCORPORATED, Corning, NY (US)

(72) Inventors: Douglas Dale Bressler, Julian, PA (US); David Alan Deneka, Corning, NY (US); Miki Eugene Kunitake, Elmira, NY (US); Ivan Fedorovich Melikhov, Saint Petersburg (RU); Ilia Andreyevich Nikulin, Ithaca, NY (US); Jia Zhang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 401 days.

(21) Appl. No.: 17/554,526

(22) Filed: Dec. 17, 2021

(65) Prior Publication Data

US 2022/0194839 A1 Jun. 23, 2022

Related U.S. Application Data

(60) Provisional application No. 63/127,330, filed on Dec. 18, 2020.

(51) Int. Cl.

*C03B 23/00* (2006.01)
*C03B 17/06* (2006.01)
*C03B 29/16* (2006.01)

(52) U.S. Cl.

CPC ............ *C03B 23/004* (2013.01); *C03B 17/06* (2013.01); *C03B 17/067* (2013.01); *C03B 29/16* (2013.01)

(58) Field of Classification Search

CPC ....... C03B 23/004; C03B 23/02; C03B 17/06; C03B 29/16; C03B 23/0006;

(Continued)

(56) References Cited

U.S. PATENT DOCUMENTS 3,233,995 A 2/1966 Glaverbel
3,326,651 A 6/1967 Glaverbel (Continued)

FOREIGN PATENT DOCUMENTS

DE 102016115297 A1 * 2/2018 ........... C03B 17/064
GB 1015517 A 1/1966

(Continued)

OTHER PUBLICATIONS

International Search Report and Written Opinion of the International Searching Authority; PCT/US2021/062341; mailed on Mar. 31, 2022, 13 pages; European Patent Office.

(Continued)

*Primary Examiner* — Jodi C Franklin
*Assistant Examiner* — Steven S Lee
(74) *Attorney, Agent, or Firm* — Yiqun Zhao

(57) ABSTRACT

A method of manufacturing a sheet of glass comprises: (a) forming a vertically oriented ribbon of glass that moves downward as a function of time, the ribbon of glass having a first primary surface and a second primary surface that face in generally opposite directions and a core disposed between the first and second primary surfaces; (b) as the ribbon of glass moves downward, passing the ribbon of glass adjacent to a first raised temperature zone liquefies the first primary surface while a temperature of the core remains below a softening temperature; and (c) after the ribbon of glass moves below the first raised temperature zone, separating a sheet of glass from the ribbon of glass. Passing the ribbon of glass adjacent the first raised temperature zone reduces total thickness variation, surface roughness, and other surface defects of the ribbon of glass.

30 Claims, 17 Drawing Sheets

(58) Field of Classification Search
CPC .............. C03B 23/0026; C03B 23/006; C03B 23/0086; C03B 23/025; C03B 23/031; C03B 23/033; C03B 23/00; C03B 23/03; C03B 17/067; C03B 13/04; C03B 23/037; C03B 17/00; C03C 3/095
See application file for complete search history.

(56) References Cited

U.S. PATENT DOCUMENTS

| | | | | |
|---|---|---|---|---|
| 5,595,583 | A | 1/1997 | Murnick | |
| 5,843,199 | A | 12/1998 | Lysson et al. | |
| 6,877,341 | B1 | 4/2005 | Hong | |
| 2004/0197575 | A1* | 10/2004 | Bocko | C03B 17/062 428/432 |
| 2007/0015651 | A1* | 1/2007 | Endo | C03B 11/08 65/129 |
| 2007/0023134 | A1* | 2/2007 | Okugawa | H01J 31/127 65/475 |
| 2007/0240453 | A1 | 10/2007 | Uno et al. | |
| 2009/0242537 | A1* | 10/2009 | Nishimoto | C03B 29/12 219/201 |
| 2009/0314032 | A1* | 12/2009 | Tomamoto | C03B 17/067 65/273 |
| 2010/0162761 | A1 | 7/2010 | Carney et al. | |
| 2011/0014445 | A1* | 1/2011 | Hawtof | C03B 19/1492 65/60.6 |
| 2011/0195638 | A1 | 8/2011 | Sasaki et al. | |
| 2011/0200805 | A1* | 8/2011 | Tomamoto | C03B 23/037 65/41 |
| 2011/0314870 | A1* | 12/2011 | Fredholm | C03B 17/061 65/185 |
| 2012/0114904 | A1* | 5/2012 | Yanase | H10K 50/858 428/141 |
| 2012/0302063 | A1* | 11/2012 | Markham | B24B 1/00 438/692 |
| 2012/0304695 | A1* | 12/2012 | Lakota | C03B 13/04 65/97 |
| 2013/0015180 | A1* | 1/2013 | Godard | C03B 17/064 219/759 |
| 2014/0013805 | A1* | 1/2014 | Kariya | C03B 17/067 65/85 |
| 2014/0144181 | A1* | 5/2014 | Poissy | C03B 13/04 65/253 |
| 2014/0196501 | A1* | 7/2014 | Nakao | G01B 5/00 65/106 |
| 2014/0283554 | A1* | 9/2014 | Fredholm | C03B 17/062 65/90 |
| 2014/0318182 | A1* | 10/2014 | Coppola | C03B 17/067 65/29.21 |
| 2015/0315066 | A1* | 11/2015 | Wolff | H10K 50/858 501/78 |
| 2016/0122226 | A1* | 5/2016 | Hunzinger | C03B 23/047 428/141 |
| 2016/0200624 | A1* | 7/2016 | Mushiake | C03B 17/067 428/446 |
| 2017/0057860 | A1* | 3/2017 | Habeck | C03B 21/06 |
| 2017/0121209 | A1* | 5/2017 | Dannoux | C03C 21/002 |
| 2018/0194665 | A1* | 7/2018 | Buckley | C03B 33/09 |
| 2018/0327296 | A1* | 11/2018 | Cimo | C03C 3/087 |
| 2018/0370837 | A1* | 12/2018 | Hu | C03C 3/091 |
| 2019/0169059 | A1* | 6/2019 | Fredholm | C03B 13/16 |
| 2020/0002211 | A1 | 1/2020 | Dannoux et al. | |
| 2020/0255316 | A1* | 8/2020 | Büllesfeld | C03C 3/062 |

FOREIGN PATENT DOCUMENTS

| | | | | | |
|---|---|---|---|---|---|
| TW | 201425258 | A | * | 7/2014 | C03B 17/02 |
| WO | WO-2010099304 | A2 | * | 9/2010 | C03B 17/065 |
| WO | WO-2017095791 | A1 | * | 6/2017 | C03B 17/068 |
| WO | WO-2017192797 | A1 | * | 11/2017 | C03B 17/02 |
| WO | 2019/081312 | A1 | | 5/2019 | |
| WO | 2021/257642 | A1 | | 12/2021 | |

OTHER PUBLICATIONS

Xiao et al., "Thermal stress limitations to laser fire polishing of glasses", Applied Optics, vol. 22, Issue 18, 1983, pp. 2933-2936.

* cited by examiner

Example 2

Comparative Example 4A

Example 4B

METHOD OF MANUFACTURING SHEETS OF GLASS WITH REDUCED TOTAL THICKNESS VARIATION

CROSS-REFERENCE TO RELATED APPLICATIONS

This application claims the benefit of priority under 35 U.S.C. § 119 of U.S. Provisional Application Ser. No. 63/127,330 filed on Dec. 18, 2020, the content of which is relied upon and incorporated herein by reference in its entirety.

TECHNICAL FIELD

This disclosure relates to sheets of glass having acceptable total thickness variation and a method of manufacturing the same by passing a ribbon of glass adjacent to one or more raised temperature zones to decrease thickness variation in the ribbon of glass from which the sheets of glass are separated.

BACKGROUND

An augmented reality system adds computer-generated imagery to a real visual scene observed by a user of the system. The augmented reality system typically includes an optical system that is configured to allow viewing of an object or scene, while adding computer-generated imagery to the actual object or scene that is being viewed directly. The optical system can utilize a light guide, which can be made of high refractive index glass, to project the computer-generated image into the user's field of view. Deviations in the geometry of the light guide can reduce the quality of the images guided through the light guide and displayed for the user. For example, the total thickness variation of the light guide should be minimized to allow for the output of high-quality images.

One process to achieve a light guide with acceptable total thickness variation is to cast boules of the high refractive index glass, to saw the boules into numerous wafers, and either to lap and polish the wafers or to reheat the wafers to flatten them. However, these processes are expensive and time-consuming. Further, reheating the wafers can cause devitrification of the glass.

Moreover, fusion processes are incompatible with high refractive index glass compositions, because the liquidus viscosity associated with such glass compositions is too low (e.g., 1 to 100 Poise).

SUMMARY

Leading up to this disclosure, a down-draw ribbon forming process was attempted to form sheets of the high refractive index glass. In down-draw ribbon forming processes, molten glass is introduced into a forming body (such as a nip between opposing rollers). The molten glass is then drawn downward into a ribbon of glass. The drawing downward of the ribbon of glass attenuates the ribbon of glass (i.e., reduces the thickness of the ribbon of glass). After the ribbon of glass cools, successive sheets of glass are separated from the ribbon. Down-draw ribbon forming processes entail a lower cost than the process described above where wafers are formed from a boule and then lapped and polished.

However, a problem was discovered. The forming body introduced thickness variation into the ribbon of glass that subsequent attenuation of the ribbon of glass did not reduce. For example, the forming body preferentially cools the primary surfaces of the glass compared to the core of the glass, in the spreading area located at the top of the forming body, resulting in undulations referred to as "chill wrinkles" at the primary surfaces. It had been assumed that the attenuation of the ribbon of glass would reduce the thickness variations. Nevertheless, models and experiments demonstrated that the attenuation did not reduce the thickness variation and, in some instances, exacerbated the thickness variation.

This disclosure addresses that problem by thermally treating the ribbon of glass so that one or more primary surfaces of the ribbon of glass liquefy before separating the sheet of glass from the ribbon of glass. Liquefying one or more primary surfaces of the ribbon of glass reduces the thickness variations. This improvement allows the form-and-draw process to be utilized to form sheets of high refractive index glass in a more economical manner.

According to a first aspect of the present disclosure, a method of manufacturing a sheet of glass comprises: (a) forming a vertically oriented ribbon of glass that moves downward as a function of time, the ribbon of glass having a first primary surface and a second primary surface that face in generally opposite directions and a core disposed between the first and second primary surfaces; (b) as the ribbon of glass moves downward, passing the ribbon of glass adjacent to a first raised temperature zone that raises a temperature of the first primary surface sufficiently to liquefy the first primary surface while a temperature of the core remains below a softening temperature; and (c) after the ribbon of glass moves below the first raised temperature zone, separating a sheet of glass from the ribbon of glass.

According to a second aspect of the present disclosure, the first aspect, wherein during (b), a viscosity of the first primary surface decreases and a total thickness variation of the ribbon of glass decreases.

According to a third aspect of the present disclosure, the second aspect, wherein between (b) and (c) and after the total thickness variation has decreased, the temperature of the first primary surface and the temperature of the core move closer to equilibrium, an effective viscosity of the ribbon of glass decreases, and a thickness of the ribbon of glass decreases.

According to a fourth aspect of the present disclosure, the method of any one of the first through third aspects further comprises: before (a), delivering molten glass to a nip between a pair of opposing forming rollers; wherein, forming the vertically oriented ribbon of glass comprises rotating the pair of forming rollers to roll the molten glass delivered to the nip into the ribbon of glass.

According to a fifth aspect of the present disclosure, the method of any one of the first through fourth aspects further comprises: after (b) and before (c), pulling the ribbon of glass downward with pulling rollers.

According to a sixth aspect of the present disclosure, the fifth aspect, wherein pulling the ribbon of glass with pulling rollers reduces a thickness of the ribbon of glass between the first primary surface and the second primary surface.

According to a seventh aspect of the present disclosure, the method of any one of the first through sixth aspects further comprises: after (b) and before (c), measuring a thickness of the ribbon of glass between the first primary surface and the second primary surface.

According to an eighth aspect of the present disclosure, any one of the first through seventh aspects, wherein the first primary surface of the separated sheet of glass has a surface roughness ($R_a$) less than 500 nm.

According to a ninth aspect of the present disclosure, any one of the first through eighth aspects, wherein the sheet of glass separated from the ribbon of glass has a total thickness variation that is less than 5 μm.

According to a tenth aspect of the present disclosure, any one of the first through ninth aspects, wherein the sheet of glass separated from the ribbon of glass has a total thickness variation that is 50% or less than a total thickness variation of the ribbon of glass before step (b).

According to an eleventh aspect of the present disclosure, any one of the first through tenth aspects, wherein the ribbon of glass after (a) but before (b) has a thickness between the first primary surface and the second primary surface that is 3 mm to 5 mm.

According to a twelfth aspect of the present disclosure, any one of the first through eleventh aspects, wherein the ribbon of glass after (b) has a thickness between the first primary surface and the second primary surface that is at least 1.5 mm.

According to a thirteenth aspect of the present disclosure, any one of the first through twelfth aspects, wherein the ribbon of glass has a thickness between the first primary surface and the second primary surface that decreases between (b) and (c).

According to a fourteenth aspect of the present disclosure, any one of the first through thirteenth aspects, wherein raising the temperature of the first primary surface comprises directing a flame at the first primary surface.

According to a fifteenth aspect, the fourteenth aspect, wherein (i) a horizontally oriented line burner directs the flame at the first primary surface; and (ii) the horizontally oriented line burner has a horizontal width that is narrower than a horizontal width of the ribbon of glass facing the horizontally oriented line burner.

According to a sixteenth aspect, any one of the first through fifteenth aspects, wherein raising the temperature of the first primary surface comprises facing the first primary surface at a hot body that transfers heat to the first primary surface primarily via thermal radiation.

According to a seventeenth aspect, any one of the first through sixteenth aspects, wherein step (b) reduces devitrification within the ribbon of glass.

According to an eighteenth aspect, any one of the first through seventeenth aspects, wherein (i) before (b), the ribbon of glass has a viscosity of $10^{10}$ Poise to $10^{12}$ Poise; (ii) during (b), the viscosity of the ribbon of glass at the first primary surface is reduced to $10^5$ Poise or less into a depth of at least 100 μm into a thickness of the ribbon of glass from the first primary surface; and (iii) before (c), the viscosity of the bulk of the ribbon of glass rises to $10^6$ Poise to $10^8$ Poise.

According to a nineteenth aspect, any one of the first through eighteenth aspects, wherein step (b) occurs within a time period of less than 10 seconds.

According to a twentieth aspect, any one of the first through nineteenth aspects, wherein the sheet of glass has an index of refraction, at a temperature of 20° C. to 25° C. and for a wavelength of 589 nm to 633 nm, of 1.75 to 2.5.

According to a twenty-first aspect, a method of manufacturing a sheet of glass comprises: (a) forming a vertically oriented ribbon of glass that moves downward as a function of time, the ribbon of glass having a first primary surface and a second primary surface that face in generally opposite directions and a core disposed between the first and second primary surfaces; (b) as the ribbon of glass moves downward, passing the ribbon of glass adjacent to (i) a first raised temperature zone that raises a temperature of the first primary surface sufficiently to liquefy the first primary surface while a temperature of the core remains below a softening temperature and (ii) a second raised temperature zone that raises a temperature of the second primary surface to a liquidus temperature while the temperature of the core remains below the softening temperature; and (c) after the ribbon of glass moves below the first raised temperature zone and the second raised temperature zone, separating a sheet of glass from the ribbon of glass.

According to a twenty-second aspect of the present disclosure, the twenty-first aspect wherein the first raised temperature zone and the second raised temperature zone are vertically staggered.

According to a twenty-third aspect of the present disclosure, the twenty-first aspect wherein the first raised temperature zone and the second raised temperature zone both overlap a horizontal plane.

According to a twenty-fourth aspect of the present disclosure, any one of the twenty-first through twenty-second aspects, wherein during (b), a viscosity of the first primary surface decreases, a viscosity of the second primary surface decreases, and a total thickness variation of the ribbon of glass decreases.

According to a twenty-fifth aspect of the present disclosure, any one of the twenty-first through twenty-third aspects, wherein between (b) and (c) and after the total thickness variation of the ribbon of glass has decreased, the temperatures of the first primary surface, the second primary surface, and the core move closer to equilibrium, an effective viscosity of the ribbon of glass decreases, and a thickness of the ribbon of glass decreases.

DETAILED DESCRIPTION

Figure 1:
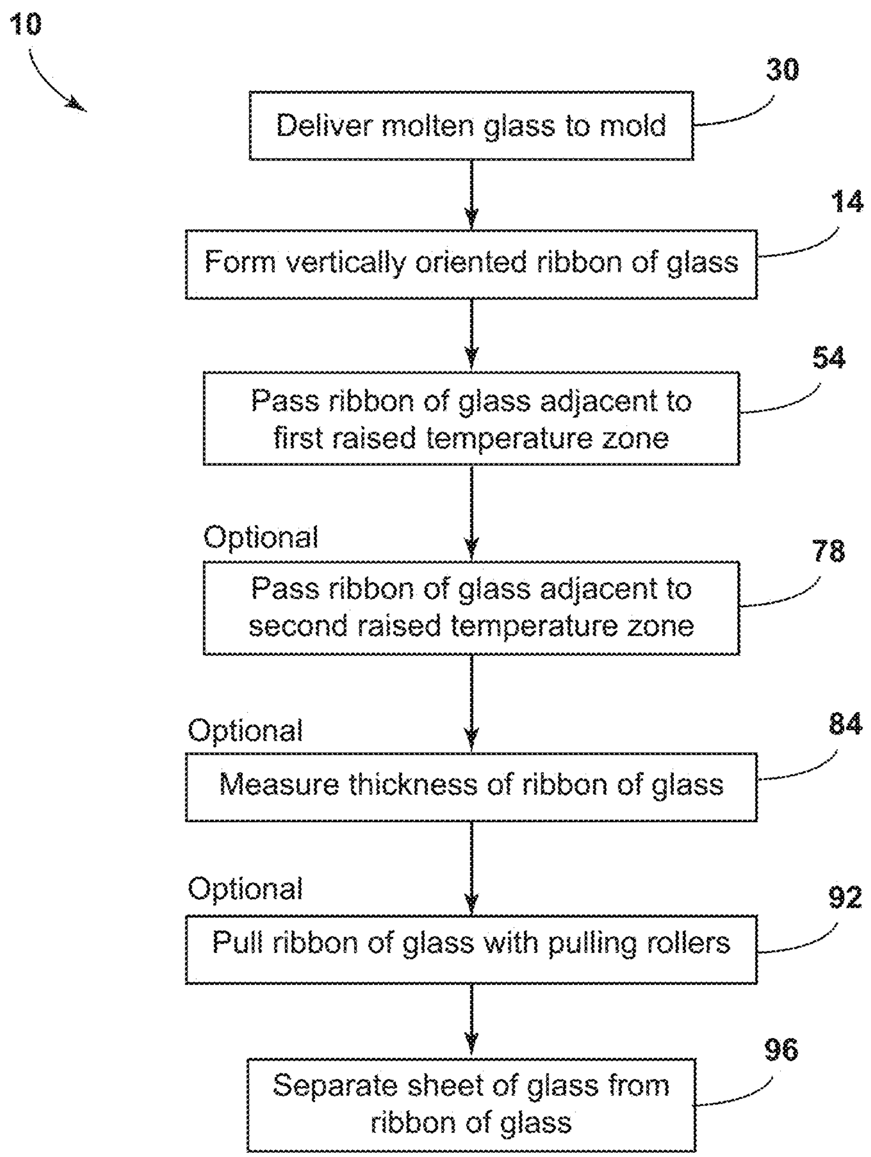
FIG. 1 is a flow chart of a method of manufacturing a sheet of glass according to embodiments of the present disclosure.

Referring now to FIGS. 1-7B, a method 10 of manufacturing a sheet of glass 12 is herein described. In a step 14, the method 10 includes forming a vertically oriented ribbon of glass 16. The ribbon of glass 16 has a first primary surface 18 and a second primary surface 20. The first primary surface 18 and the second primary surface 20 face in generally opposite directions. The ribbon of glass 16 further includes first lateral edge 22 and second lateral edge 24, which define generally opposite sides of the ribbon of glass 16. By "vertically oriented" it is meant that the first primary surface 18 and the second primary surface 20 form approximately vertical planes. The ribbon of glass 16 has a thickness 26, which is the horizontal distance between the first primary surface 18 and the second primary surface 20. The ribbon of glass 16 has a width 28, which is the horizontal distance between the first lateral edge 22 and the second lateral edge 24. The thickness 26 and width 28 of the ribbon of glass 16 can change as a function of vertical position along the ribbon of glass 16. The ribbon of glass 16 has a composition.

At a step 30, the method 10 further comprises delivering molten glass 32 to a mold 34. The mold 34 forms the ribbon of glass 16.

Figure 2:
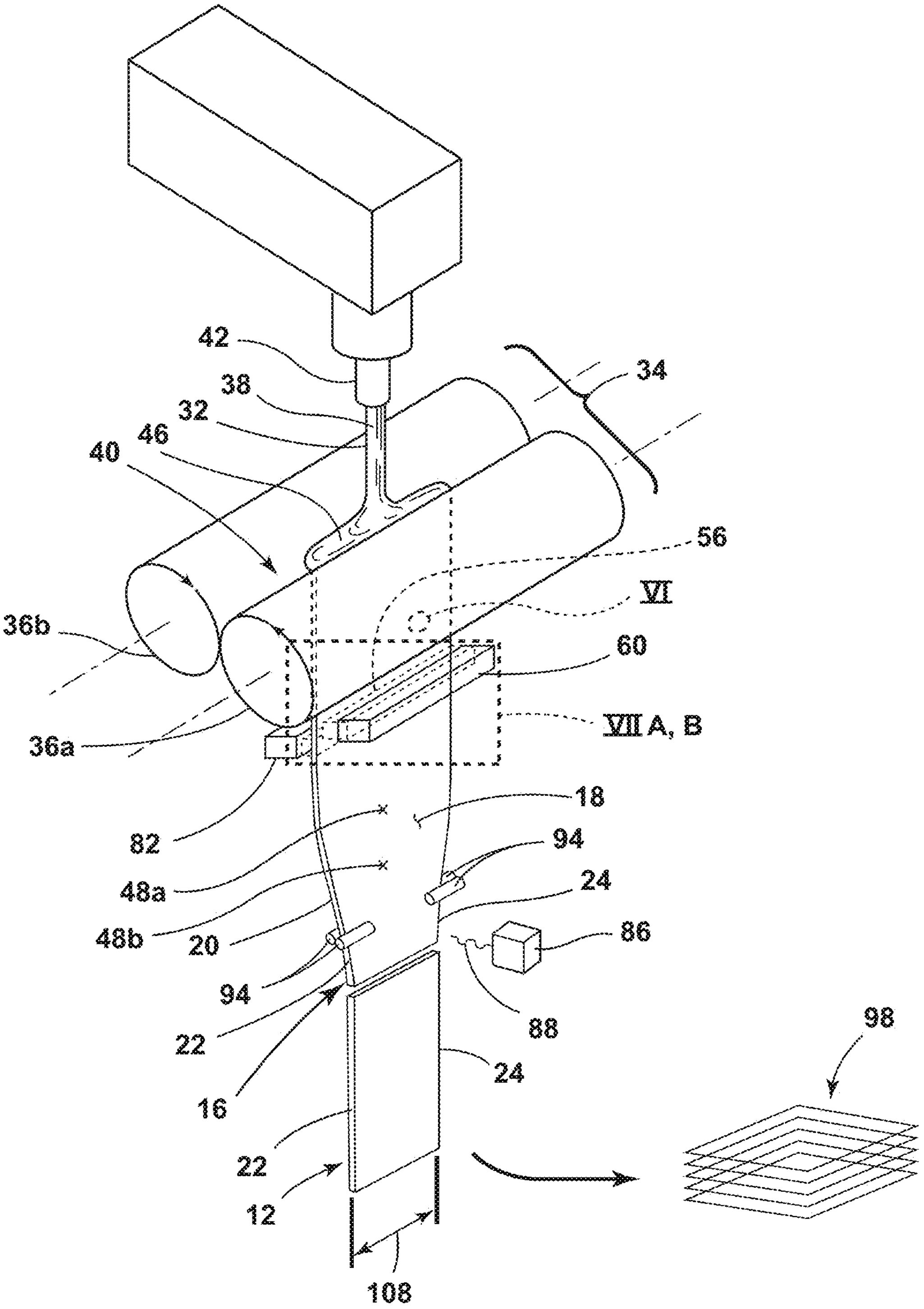
FIG. 2 is a perspective view of a mold in the form of a pair of forming rollers that form a vertically oriented ribbon of glass from molten glass delivered to the pair of forming rollers, and the sheet of glass separated from the ribbon glass, according to the method of FIG. 1.
Figure 3A:
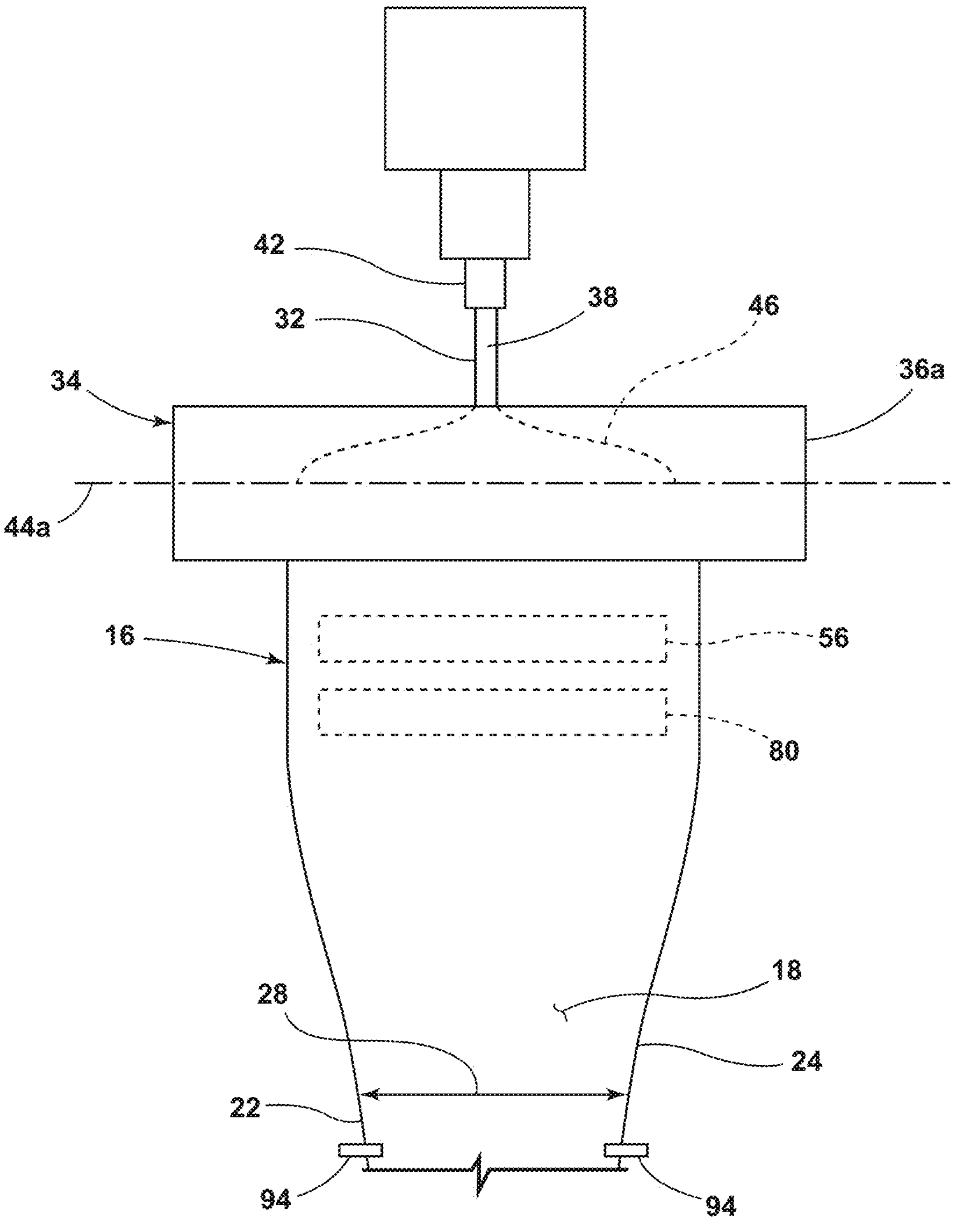
FIG. 3A is an elevation view of the circumstances of FIG. 2, illustrating the ribbon of glass being passed adjacent to a first raised temperature zone and a second raised temperature zone, which are vertically staggered, in order to raise a temperature of a first primary surface and a second primary surface of the ribbon of glass sufficiently to liquefy the ribbon of glass at the first primary surface and the second primary surface while a core of the ribbon of glass has a temperature below a softening temperature, so that surface tension reduces total thickness variation and surface defects of the ribbon of glass before the ribbon of glass attenuates.
Figure 3B:
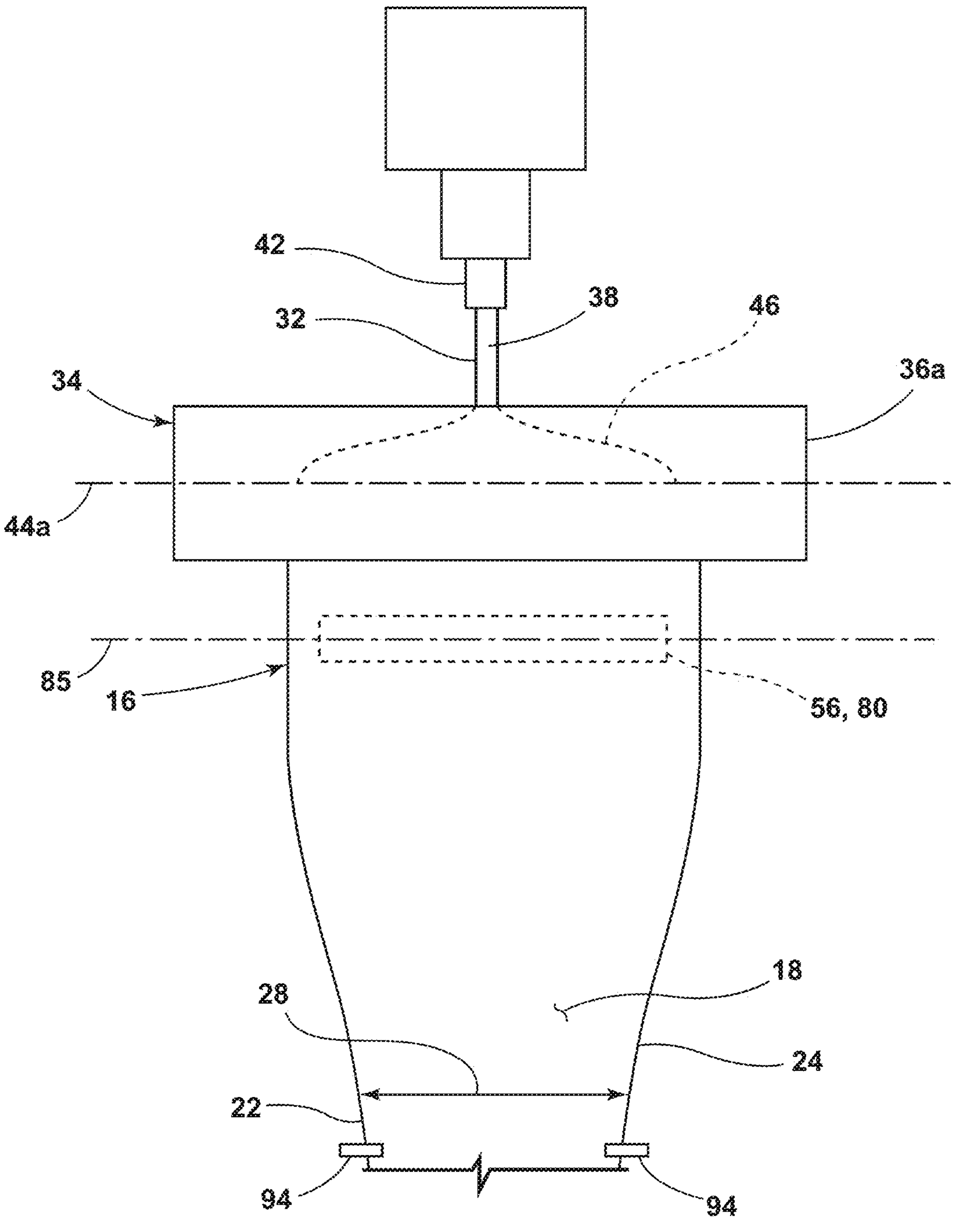
FIG. 3B is the same view as FIG. 3A except illustrating the ribbon of glass being passed adjacent to the first raised temperature zone and a second raised temperature zone, which are not vertically staggered—that is, the first raised temperature zone and the second raised temperature zone both overlap a horizontal plane extending through the ribbon of glass.
Figure 4A:
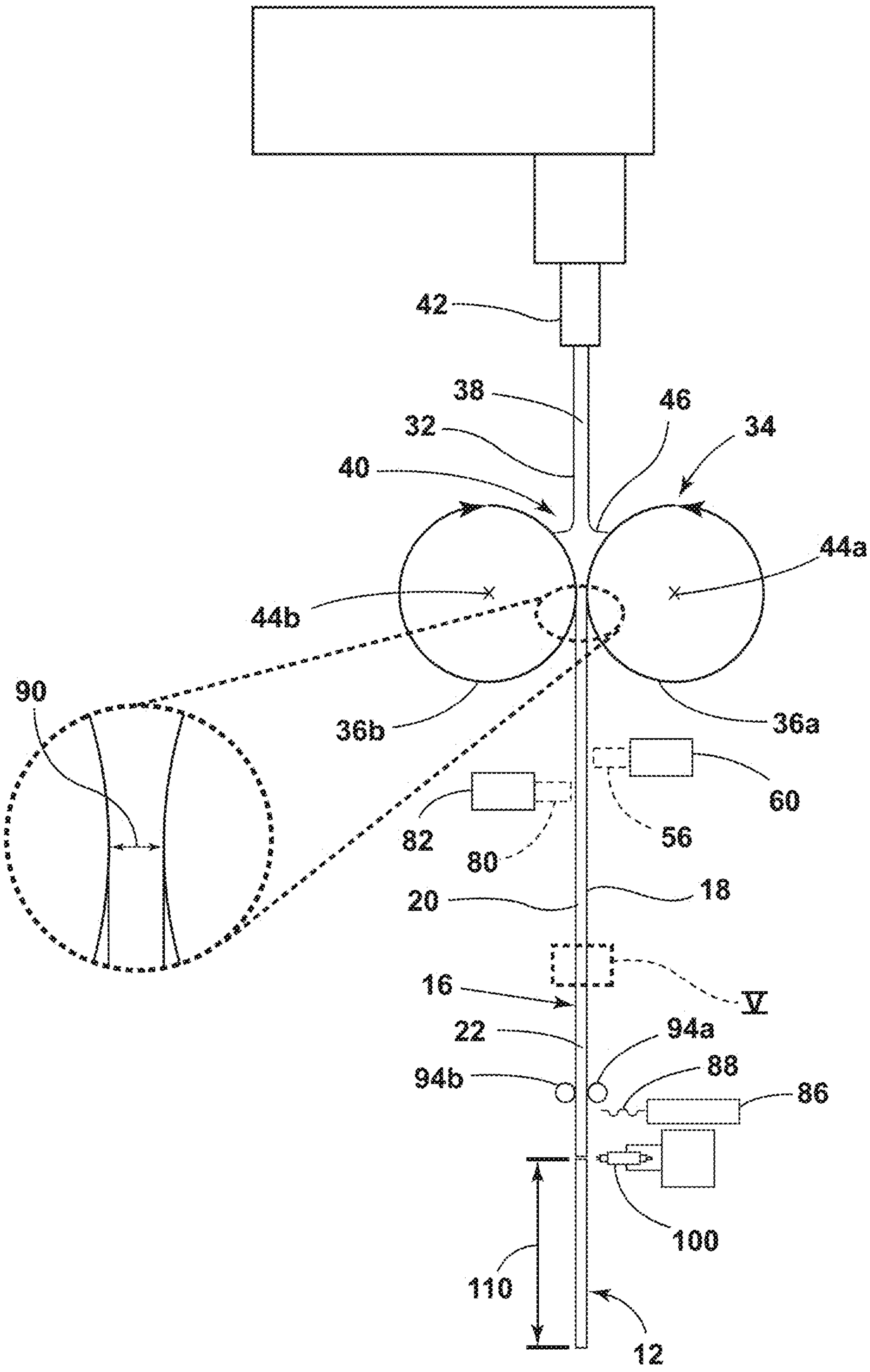
FIG. 4A is side view of the circumstances of FIG. 2, illustrating the first raised temperature zone and the second raised temperature zones having staggered vertical positions.
Figure 4B:
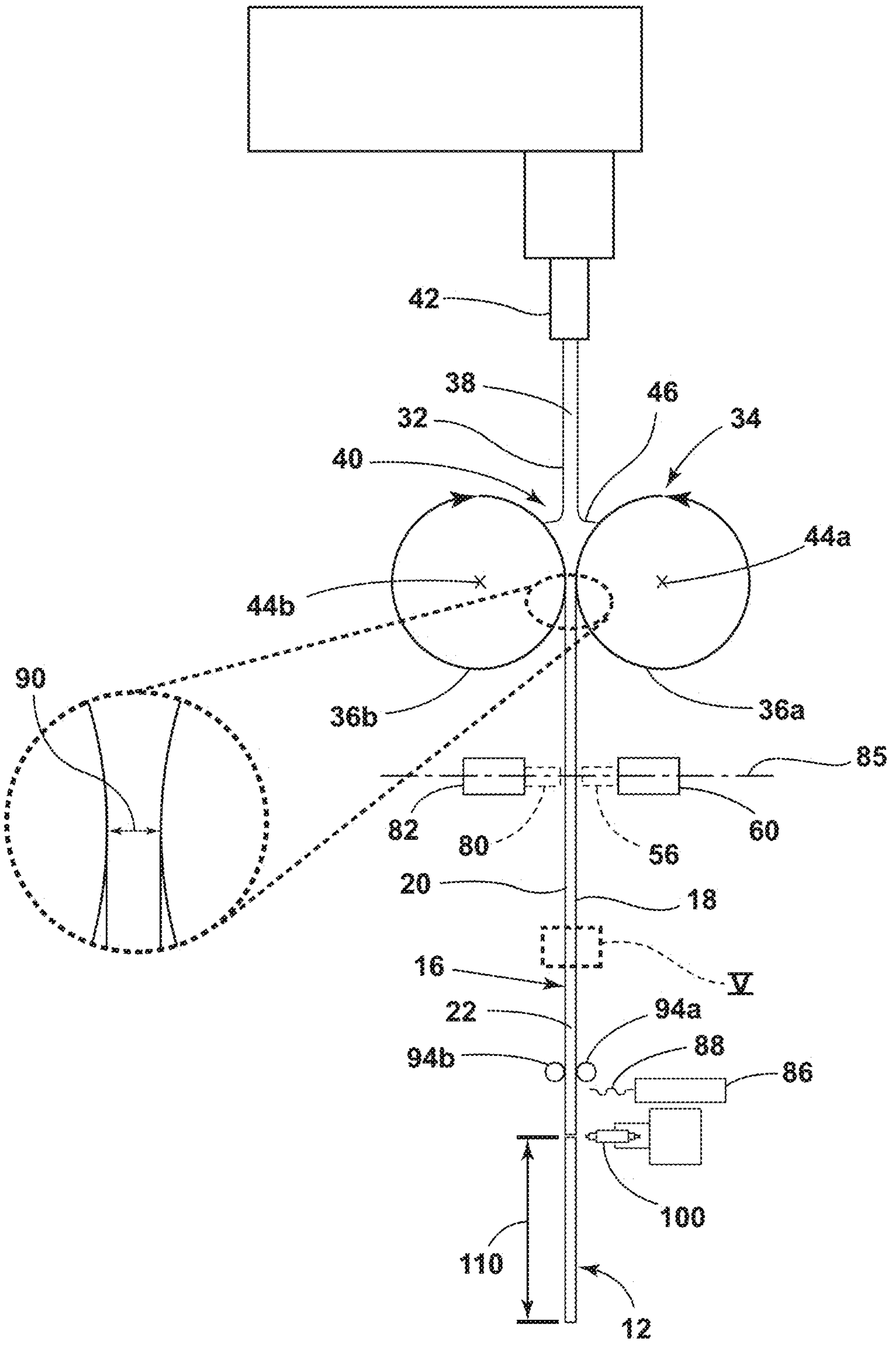
FIG. 4B is a side view of the circumstances of FIG. 2, illustrating the first raised temperature zone and the second raised temperature zones having vertical positions that are not staggered and thus both overlapping the horizontal plane.

In embodiments, the mold 34 comprises a pair of opposing forming rollers 36*a*, 36*b*. In such embodiments, the step 30 of delivering molten glass 32 to the mold 34 includes delivering the molten glass 32 as a stream 38 to a nip 40 between the pair of forming rollers 36*a*, 36*b*. The stream 38 of molten glass 32 may be delivered, by way of example only, from a fish tail or slot 42 to the center of the nip 40. The stream 38 is delivered from above horizontal axes of rotation 44*a*, 44*b* of the pair of forming rollers 36*a*, 36*b*. The slot 42 may have wide ranges of widths/lengths and thicknesses. The stream 38 of molten glass 32 may be delivered to the nip 40 at a glass temperature of about 1000° C. or higher, and have a viscosity on the order of $10^1$ Poise. The delivered molten glass 32 forms a puddle 46 of the molten glass 32 on the pair of forming rollers 36*a*, 36*b*. The pair of forming rollers 36*a*, 36*b* can be temperature controlled to have a surface temperature in a range from about 500° C. to about 600° C., or higher, depending on the composition and viscosity of the glass being formed. Processes and devices for the temperature control of the pair of forming rollers 36*a*, 36*b* are well understood in the art and are therefore not described in detail herein. In such embodiments using the pair of forming rollers 36*a*, 36*b*, the step 14 of forming the vertically oriented ribbon of glass 16 comprises rotating the pair of forming rollers 36*a*, 36*b* to roll the molten glass 32 delivered to the nip 40 into the ribbon of glass 16. The pair of forming rollers 36*a*, 36*b* rotate inwards toward the puddle of molten glass as indicated by the arrows of FIG. 2, which causes the molten glass 32 in the puddle 46 to flatten, thin, and smoothen into the ribbon of glass 16 extending vertically below the axes of rotation 44*a*, 44*b* of the pair of forming rollers 36*a*, 36*b*.

The use of the pair of forming rollers 36*a*, 36*b* as the mold 34 to form the ribbon of glass 16 is just one example of the mold 34 and is not meant to be limiting. The method 10 encompasses any type of mold 34 that can be utilized to form the ribbon of glass 16 vertically from the mold 34.

The ribbon of glass 16 moves downward after formation as a function of time. In other words, the mold 34 continuously forms the ribbon of glass 16 until the source of molten glass 32 for the ribbon of glass 16 is exhausted. For example, a volume within the ribbon of glass 16 might be at a position 48*a* at a first time, and then moves downward to a position 48*b* at a later time, as the ribbon of glass 16 continues to be formed.

Figure 5:
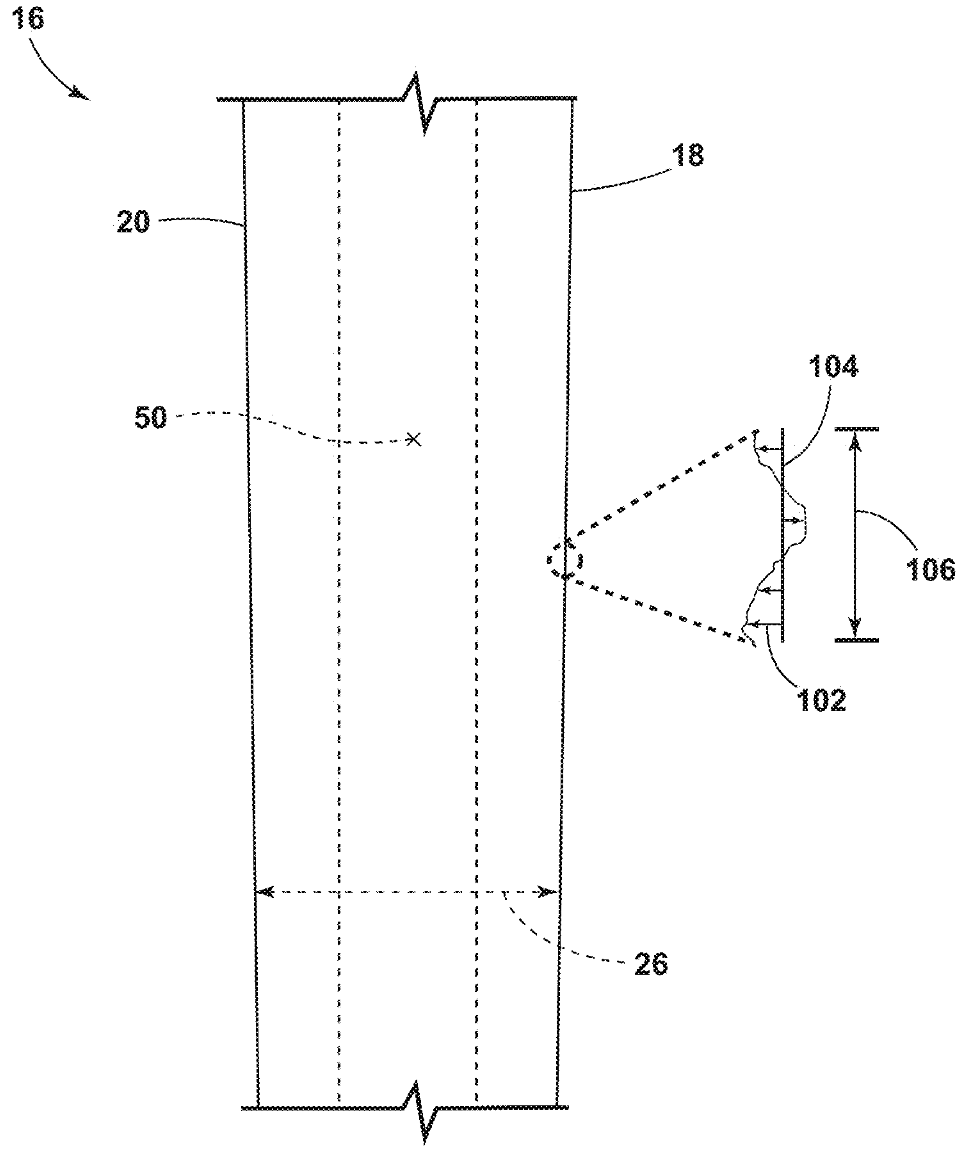
FIG. 5 is a close-up view of area V of FIGS. 4A, 4B, illustrating a thickness between the first primary surface and the second primary surface, and the first primary surface having a surface roughness.
Figure 6:
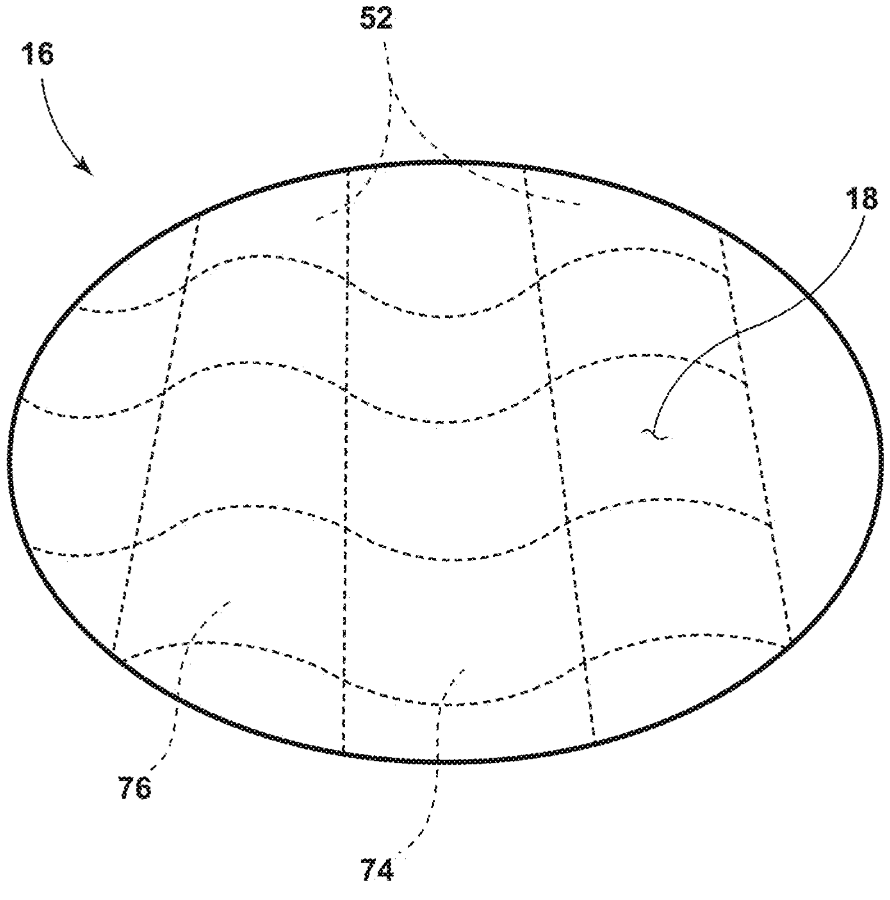
FIG. 6 is a close-up view of area VI of FIG. 2, illustrating the first primary surface of the ribbon of glass having chill wrinkles that contribute to the total thickness variation of the ribbon of glass.

The ribbon of glass 16 includes a core 50 (see FIG. 5). The core 50 is disposed between the first primary surface 18 and the second primary surface 20, such as including a volume that is equidistant between the first primary surface 18 and the second primary surface 20, as well as equidistant between the first lateral edge 22 and the second lateral edge 24. In embodiments, the core 50 is at least 40 percent of the thickness 26 away from the first primary surface 18 and at least 40 percent of the thickness 26 away from the second primary surface 20. In embodiments, the core 50 is at least 40 percent of the width 28 away from the first lateral edge 22 and at least 40 percent of the width 28 away from the second lateral edge 24.

After the ribbon of glass 16 is formed, the ribbon of glass 16 solidifies. The first primary surface 18 and the second primary surface 20 solidify with surface defects such as chill wrinkles 52, other thickness 26 variations, and roughness that the mold 34 imparts onto the primary surfaces 18, 20. Chill wrinkles 52 are undulations created when the primary surfaces 18, 20 are cooled preferentially relative to the core 50 of the ribbon of glass 16 after formation. Chill wrinkles 52 are difficult to avoid during formation because of rapid heat transfer out of the glass. Pressure checks (i.e., cracks), scratches, and other defects may be present.

In a step 54, the method 10 further includes passing the ribbon of glass 16 adjacent to a first raised temperature zone 56. The first raised temperature zone 56 applies a heat flux to the first primary surface 18 of the ribbon of glass 16 that raises a temperature of the first primary surface 18 sufficiently to liquefy the composition of the ribbon of glass 16 at the first primary surface 18. This may correspond to the ribbon of glass 16 having a viscosity from the first primary surface 18 to a depth of at least 100 μm (such as 100 μm to 500 μm) into the thickness 26 of $10^5$ Poise or less, such as on the order of $10^4$ Poise or $10^3$ Poise to $10^5$ Poise. However, the thickness 26 of the ribbon of glass 16, the rate of downward movement of the ribbon of glass 16, and the first raised temperature zone 56 are all configured so that a temperature of the core 50 of the ribbon of glass 16 remains below a softening temperature of the composition of the ribbon of glass 16. If the core 50 were to soften, then the ribbon of glass 16 would attenuate before the surface defects were reduced or eliminated. For example, for any given rate of downward movement of the ribbon of glass 16 and heat flux provided at the first raised temperature zone 56, the thickness 26 of the ribbon of glass 16 can be increased so that the first raised temperature zone 56 liquefies the first primary surface 18 without simultaneously causing the core 50 to soften and lose structural integrity. Alternatively, the heat flux provided at the first raised temperature zone 56 can be applied to a narrower length of the ribbon of glass 16 or be decreased in intensity to allow for a thinner thickness 26 ribbon of glass 16 to be liquefied at the first primary surface 18 but not softened at the core 50. In embodiments, the thickness 26 of the ribbon of glass 16 upon becoming adjacent to the first raised temperature zone 56 is 3 mm to 5 mm. The thickness 26 here refers to any measured thickness 26 at any position between the two lateral edges 22, 24.

The first raised temperature zone 56 raising the temperature of the first primary surface 18 sufficiently to liquefy the first primary surface 18 (and thus lowering the viscosity from the first primary surface 18 into the thickness 26) while the temperature of the core 50 remains below the softening temperature permits the surface tension at the first primary surface 18 to reduce or eliminate the surface defects. In other words, the chill wrinkles 52 present at the first primary surface 18 before being adjacent to the first raised temperature zone 56 are reduced in prominence or eliminated while the first primary surface 18 is liquefied adjacent to the first raised temperature zone 56. Total thickness variation of the ribbon of glass 16 is reduced. The surface roughness ($R_a$) at the first primary surface 18 is reduced. Pressure checks and scratches that the ribbon of glass 16 may have had before entering the first raised temperature zone 56 can be healed and removed. Other surface defects are removed or have reduced prominence. "Total thickness variation" as used herein means the difference between the minimum thickness 26 and the maximum thickness 26. For the ribbon of glass 16, the minimum and maximum thicknesses 26 are for measured thicknesses 26 along the same horizontal line. For the sheet of glass 12, the total thickness variation is the difference between the minimum and the maximum thicknesses 26 of the entire sheet of glass 12 in free, unclamped, state.

As mentioned, the ribbon of glass 16 solidifies before entering the first raised temperature zone 56. This may correspond to the ribbon of glass 16 having a viscosity of $10^{10}$ Poise to $10^{12}$ Poise, such as on the order of $10^{11}$ Poise. The ribbon of glass 16 need not to have cooled to below a setting zone of the composition where the ribbon of glass 16 has an elastic state. In the elastic state, the profile of the ribbon of glass 16 is frozen as a characteristic of the ribbon of glass 16. While the ribbon of glass 16 may be flexed away from this configuration, internal stresses can cause the ribbon of glass 16 to bias back to the original set profile. However, in embodiments, the ribbon of glass 16 has cooled to below the setting zone of the composition before becoming adjacent to the first raised temperature zone 56. Indeed, in embodiments, the ribbon of glass 16 has cooled to the ambient temperature before becoming adjacent to the first raised temperature zone 56. Nevertheless, it may be beneficial that the ribbon of glass 16 have a temperature above an annealing temperature of the composition upon becoming adjacent to the first raised temperature zone 56 to minimize stress throughout the ribbon of glass 16. The annealing temperature of the composition is the temperature where the composition has a viscosity of approximately $10^{13}$ Poise.

In embodiments, this step 54 occurs within a time period of 1 second to 10 seconds. In other words, a given portion of the ribbon of glass 16 passes adjacent to the first raised temperature zone 56 only through the time period of 1 second to 10 seconds. In embodiments, step 54 occurs within a time period of 1 second, 2 seconds, 3 seconds, 4 seconds, 5 seconds, 6 seconds, 7 seconds, 8 seconds, 9 seconds, or 10 seconds, or any time period between any two of those time periods (e.g., 2 seconds to 9 seconds). After that time period, the given portion of the ribbon of glass 16 has descended downward past the first raised temperature zone 56. With a time period shorter than 1 second, the heat flux provided to the first primary surface 18 will likely be insufficient to raise the temperature of the ribbon of glass 16 at the first primary surface 18 sufficiently to liquefy the first primary surface 18, and even if it is sufficient, the depth into the thickness 26 contiguous with the first primary surface 18 that is liquefied would be insufficient to appreciably remove surface defects. A time period greater than 10 seconds is greater than the time period required for surface tension at the liquefied first primary surface 18 to remove surface defects and thus a longer period is unnecessary. Further, a time period greater than 10 seconds unnecessarily increases the risk that the heat flux provided to the first primary surface 18 will additionally soften the core 50.

In embodiments, the step 54 of the method 10 reduces devitrification within the ribbon of glass 16. Before the ribbon of glass 16 passes adjacent to the first raised temperature zone 56, the ribbon of glass 16 may have some level of devitrification, including devitrification contiguous with the first primary surface 18 of the ribbon of glass 16. The rapid heating of the first primary surface 18 sufficiently to liquefy the first primary surface 18, and subsequent cooling, reduces devitrification within the ribbon of glass 16 if present.

In embodiments, raising the temperature of the first primary surface 18 during step 54 of the method 10 comprises directing a flame 58 (see FIG. 7A) at the first primary surface 18. For example, in an embodiment, a horizontally oriented line burner 60 directs the flame 58 of combusted fuel at the first primary surface 18 of the ribbon of glass 16, which causes the temperature of the first primary surface 18 to rise and the first primary surface 18 to liquefy. The line burner 60 is "horizontally oriented" in that the line burner 60 has a horizontal width 62 and a vertical height 64, and the horizontal width 62 is greater than the vertical height 64, such as at least 3 times greater. In embodiments, the horizontal width 62 is narrower than the width 28 of the ribbon of glass 16 facing the line burner 60. In such embodiments, the line burner 60 can be centrally disposed so as to not extend laterally beyond either of the lateral edges 22, 24 of the ribbon of glass 16.

Figure 7A:
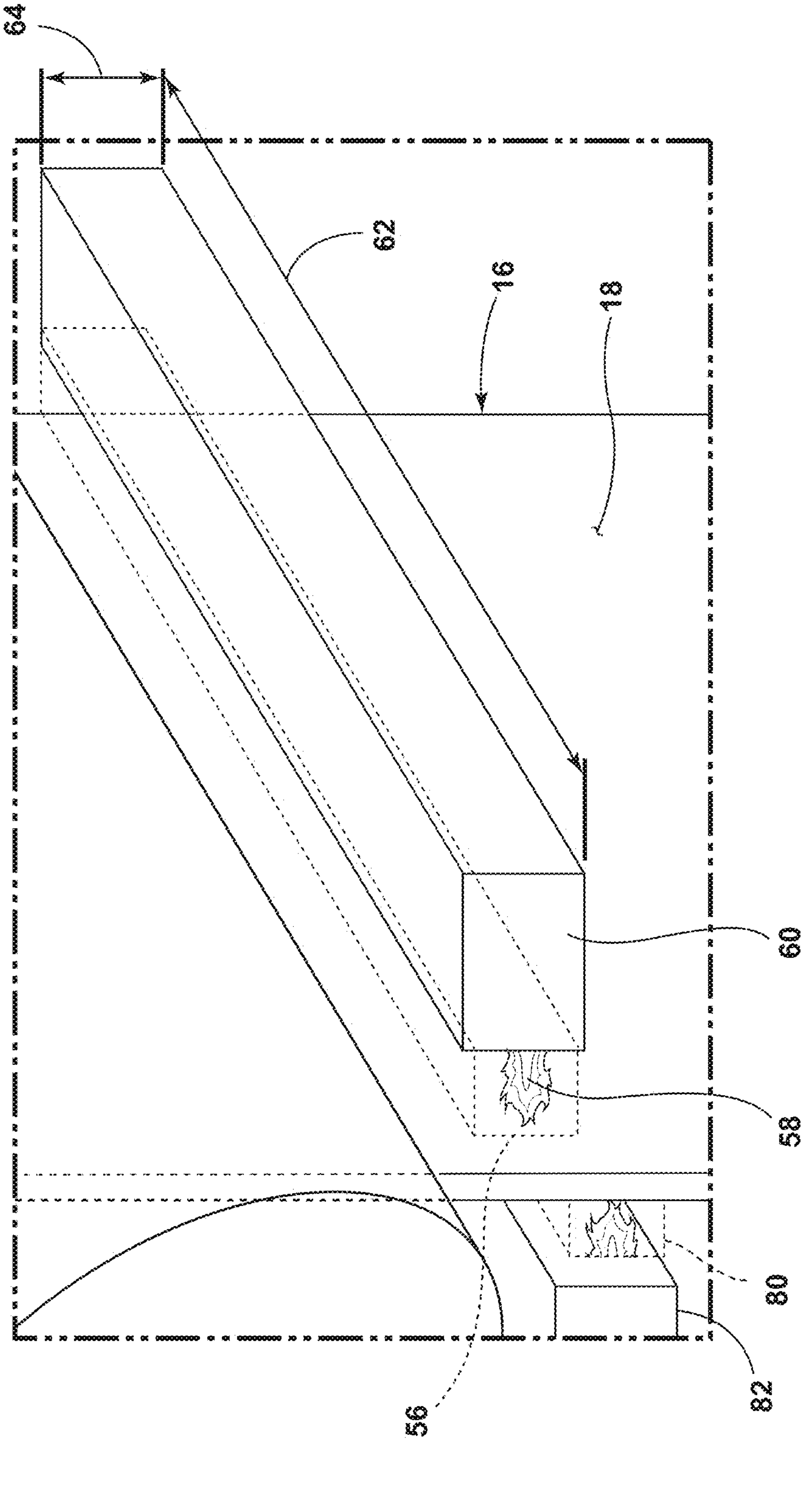
FIG. 7A is a perspective view of an embodiment of the first raised temperature zone and the second raised temperature zone of FIG. 3, illustrating a first horizontally oriented line burner directing a flame toward the first primary surface of the ribbon of glass to liquefy the first primary surface, and a second horizontally oriented line burner directing a flame toward the second primary surface of the ribbon of glass to liquefy the second primary surface.
Figure 7B:
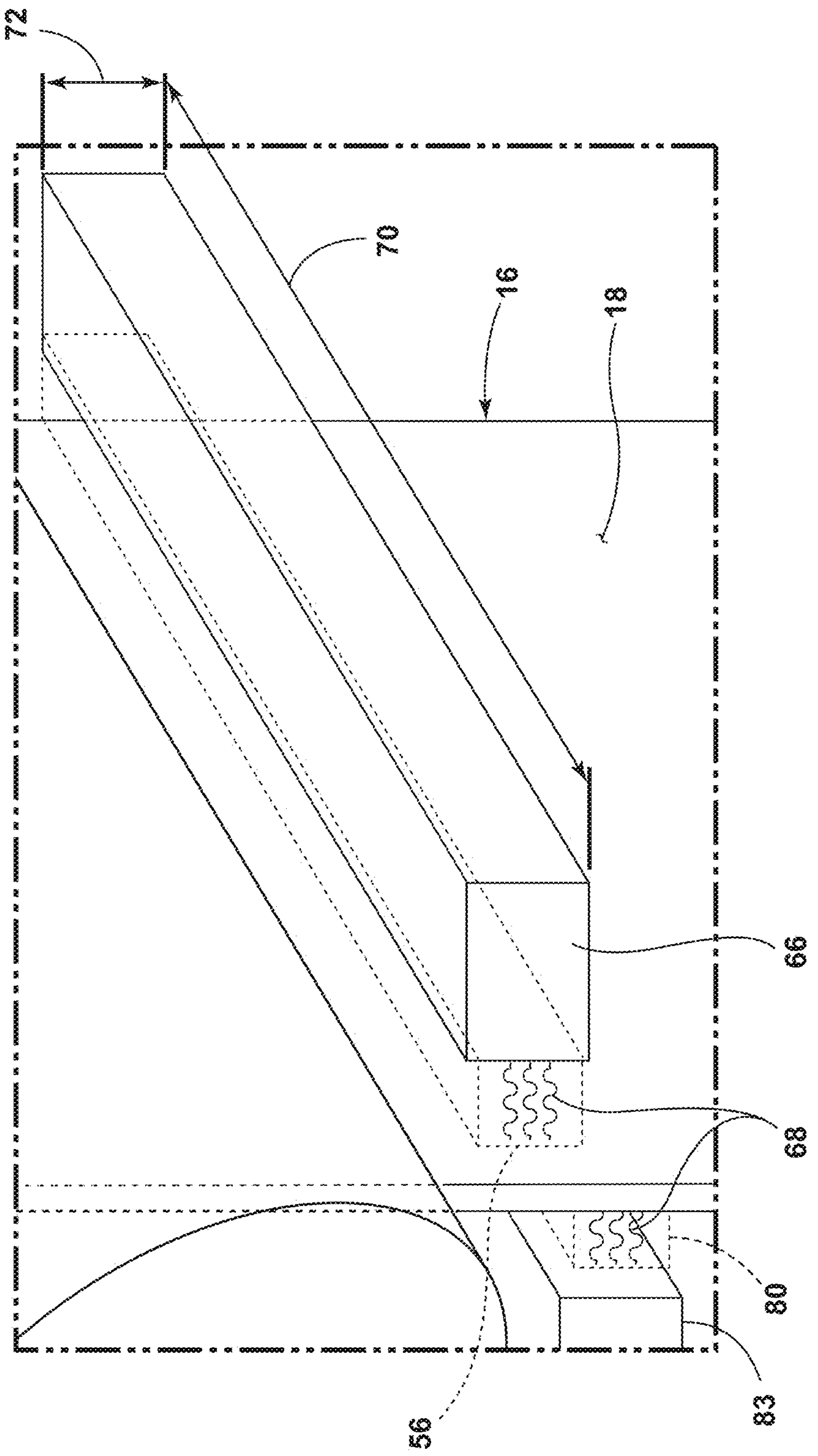
FIG. 7B is a perspective view of another embodiment of the first raised temperature zone and the second raised temperature zone of FIG. 3, illustrating a first hot body transferring heat to the first primary surface throughout the first raised temperature zone primarily through thermal radiation to liquefy the first primary surface, and a second hot body transferring heat to the second primary surface throughout the second raised temperature zone primarily through thermal radiation to liquefy the second primary surface.

In other embodiments, raising the temperature of the first primary surface 18 sufficiently to liquefy the first primary surface 18 comprises facing the first primary surface 18 at a hot body 66 (see FIG. 7B). The hot body 66 transfers heat to the first primary surface 18 throughout the first raised temperature zone 56 primarily through thermal radiation 68, although heat transfer via convection of air occurs as well. In other words, the hot body 66 does not have turbines that direct heated gas toward the first primary surface 18 of the ribbon of glass 16. Like the line burner 60, the hot body 66 can be horizontally oriented with a width 70 exceeding a height 72 by several times. The hot body 66 can be centrally disposed so as to not extend laterally beyond either of the lateral edges 22, 24 of the ribbon of glass 16.

The utilization of the line burner 60 and the hot body 66 to raise the temperature of the first primary surface 18 sufficiently to liquefy the first primary surface 18 are examples that are not meant to be exclusive. The method 10 encompasses any device that liquefies the first primary surface 18.

After the ribbon of glass 16 moves downward and is no longer adjacent to the first raised temperature zone 56, and after the total thickness variation at the first primary surface 18 has decreased, the temperature of the ribbon of glass 16 at the two primary surfaces 18, 20 and the core 50 move closer to equilibrium. The core 50 increases in temperature. The first primary surface 18 decreases in temperature. As a consequence, the effective viscosity of the ribbon of glass 16 decreases, such as to $10^6$ Poise to $10^8$ Poise, or on the order of $10^7$ Poise. "Effective viscosity" refers to the average viscosity of the ribbon of glass 16 throughout a horizontal cross-section of the ribbon of glass 16. Because the effective viscosity of the ribbon of glass 16 decreases, the ribbon of glass 16 attenuates downward (either under its own weight or being pulled by pulling rollers, discussed below, or both), which results in the thickness 26 and width 28 of the ribbon of glass 16 decreasing as a function of downward position. In embodiments, the ribbon of glass 16 after being adjacent to the first raised temperature zone 56 has a thickness 26 of least 1.5 mm.

It had been previously assumed that attenuation without first reducing or eliminating the surface defects during the step 54 would nevertheless reduce or eliminate the surface defects. The thought was that every aspect of the ribbon of glass 16 would shrink proportionally, including the surface defects. However, modeling and experiments have surprisingly demonstrated that if the first raised temperature zone 56 is too aggressive and raises the temperature of the core 50 above the softening temperature of the composition of the ribbon of glass 16, then the ribbon of glass 16 attenuates (that is, stretches downward causing a reduction in thickness 26 and width 28) without reducing or eliminating the surface defects. The thinner portions of the ribbon of glass 16, such as the ribbon of glass 16 in valleys 74 of the chill wrinkles 52, preferentially attenuate. That preferential attenuation exacerbates the chill wrinkles 52 and other defects, making peaks 76 thereof more prominent by moving the valleys 74 thereof closer to the core 50. In other words, step 54 of the method 10 has to be performed so surface tension reduces or eliminates the surface defects before attenuation of the ribbon of glass 16 occurs. Otherwise, the attenuation of the ribbon of glass 16 merely exacerbates the surface defects.

In embodiments, at a step 78, the method 10 further includes passing the ribbon of glass 16 adjacent to a second raised temperature zone 80. The second raised temperature zone 80 raises the temperature of the second primary surface 20 sufficiently to liquefy the ribbon of glass 16 at the second primary surface 20 and into the thickness 26 from the second primary surface 20 to a depth of at least 100 μm (such as 100 μm to 500 μm). As with the first raised temperature zone 56, the thickness 26 of the ribbon of glass 16, the rate of downward movement of the ribbon of glass 16, and the second raised temperature zone 80 are all configured so that the temperature of the core 50 of the ribbon of glass 16 remains below the softening temperature of the composition of the ribbon of glass 16. This allows surface tension to heal surface defects at the second primary surface 20 before the ribbon of glass 16 attenuates, and causes the total thickness variation of the ribbon of glass 16 to further decrease. Devitrification may additionally be removed during this step 78. The raising of the temperature of the second primary surface 20 sufficient to liquefy the second primary surface 20 can be done in the same manner as the raising of the temperature of the first primary surface 18 discussed above, and need not be repeated. For example, in embodiments, the raising of the temperature of the second primary surface 20 comprises directing a flame at the second primary surface 20, such as with a second horizontally oriented line burner 82 or a second hot body 83. The second horizontally oriented line burner 82 and the second hot body 83 are identical to the line burner 60 and the hot body 66 but are disposed facing the second primary surface 20 of the ribbon of glass 16 instead of the first primary surface 18. In any event, after the total thickness variation of the ribbon of glass 16 has decreased and the ribbon of glass 16 moves downward past the second raised temperature zone 80, the temperature of the first primary surface 18, the second primary surface 20, and the core 50 move closer to equilibrium, the effective viscosity of the ribbon of glass 16 decreases, and the ribbon of glass 16 attenuates causing the thickness 26 of the ribbon of glass 16 to decrease.

In embodiments, the first raised temperature zone 56 and the second raised temperature zone 80 both overlap a horizontal plane 85. The horizontal plane 85 is a conceptual plane extending through the ribbon of glass 16. In such a circumstance, the first primary surface 18 and the second primary surface 20 are simultaneously raised to a temperature sufficient to liquefy the first primary surface 18 and the second primary surface, while the core 50 remains above a softening temperature.

In other embodiments, the first raised temperature zone 56 and the second raised temperature zone 80 are vertically staggered. That is, the first raised temperature zone 56 is disposed higher than the second raised temperature zone 80, or vice-versa, and do not overlap the horizontal plane 85. Staggering the zones 56, 80 in this manner may prevent the core 50 of the ribbon of glass 16 from softening to a degree that the ribbon of glass 16 begins to attenuate before the first primary surface 18 and the second primary surface 20 have had a chance to remove surface defects while liquefied. However, if the thickness 26 of the ribbon of glass 16 is thick enough, such staggering may be unnecessary and the two primary surfaces 18, 20 can be heated simultaneously without causing the core 50 to soften while the primary 18, 20 surfaces are liquefied and remove surface defects are removed.

In embodiments, at a step 84, the method 10 further includes measuring the thickness 26 of the ribbon of glass 16. The thickness 26 can be measured with any measurement device 86, including those that measure thickness via the transmission of light 88. For example, the measurement device 86 can be a confocal chromatic imager. Measuring the thickness 26 of the ribbon of glass 16 provides near real-time feedback so that the thickness 26 of the ribbon of glass 16 can be adjusted by changing the size of a gap 90 between the pair of forming rollers **36*a*, 36*b*, changing the flow rate of the stream 38 of molten glass 32, changing the speed of rotation of the pair of forming rollers 36*a*, 36*b*, among other options. The step 54 of the method 10 can improve the reliability of the measurement during step 84 by, for example, minimizing surface scattering of the transmitted light that could otherwise occur if the first primary surface 18 of the ribbon of glass 16** had too much surface roughness.

In embodiments, at a step 92, the method 10 further includes pulling the ribbon of glass 16 downward with pulling rollers 94. The pulling rollers 94 are disposed lower than the first raised temperature zone 56. The pulling rollers 94 can include a pair of pulling rollers 94 adjacent to the first lateral edge 22, with pulling roller **94*a* contacting the first primary surface 18 of the ribbon of glass 16 and pulling roller 94*b* contacting the second primary surface 20. In a similar manner, the pulling rollers 94 can include a pair of pulling rollers 94 adjacent to the second lateral edge 24, with the one of the pair of pulling rollers 94 contacting the first primary surface 18 and the other of the pair of pulling rollers 94 contacting the second primary surface 20. In other embodiments, a single pair of pulling rollers 94 can be centrally located between the first lateral edge 22 and the second lateral edge 24, with one of the pair of pulling rollers 94 contacting the first primary surface 18 and the other of the pair of pulling rollers 94 contacting the second primary surface 20. The pulling rollers 94 generate a slight tension in the ribbon of glass 16 in order to stabilize the ribbon of glass 16 and attenuate the ribbon of glass 16. In embodiments, the pulling rollers 94 pulling on the ribbon of glass 16 additionally reduces the thickness 26 of the ribbon of glass 16. The surface material and texture of the pulling rollers 94 should be chosen not to affect adversely the total thickness variation of the ribbon of glass 16**.

In a step 96, the method 10 further includes separating the sheet of glass 12 from the ribbon of glass 16. This step 96 occurs after the ribbon of glass 16 moves below the first raised temperature zone 56 and the second raised temperature zone 80, if included. As discussed, the ribbon of glass 16 is continuously formed until the source of molten glass 32 is exhausted. Therefore, the sheet of glass 12 can be one of a plurality 98 of sheets of glass 12 that are separated in sequence from the ribbon of glass 16. Step 96 encompasses any process utilized to separate the sheet of glass 12. In embodiments, separating the sheet of glass 12 comprises first scoring the ribbon of glass 16 and applying a tensile stress across the score to create a crack, and then driving that crack through the thickness 26 of the ribbon of glass 16. The score may be formed by any conventional method. For example, the score may be produced by contacting the ribbon of glass 16 with a scoring member 100 such as a scoring wheel, a scribe, or an abrasive member that creates damage at the first primary surface 18 or the second primary surface 20. The subsequent tensile stress is applied by bending the ribbon of glass 16 in a direction that places the scored side of the ribbon of glass 16, across the score line, in tension. The tension in turn drives the crack formed at the score line through the thickness 26 of the ribbon of glass 16. The score line is preferably formed in the quality region of the ribbon of glass 16—that is, across the width 28 of the ribbon between the lateral edges 22, 24. The first primary surface 18 and the second primary surface 20 of the ribbon of glass 16 become the first primary surface 18 and the second primary surface 20 of the sheet of glass 12.

In other embodiments, the scoring member 100 is a laser and optionally a cooling device that contacts the ribbon of glass 16 with a cooling fluid such as a cooled gas, a liquid, or a combination thereof (a mist). The laser heats the ribbon of glass 16 across the intended scoring path with a laser beam that heats a narrow region of the ribbon of glass 16 upon which the laser beam impinges. The heated path is then cooled with the cooling fluid, creating a large tension in the ribbon of glass 16 that produces a score.

In embodiments, before step 54 of the method 10 (or in the absence of step 54), the first primary surface 18 has a surface roughness ($R_a$) greater than 1000 nm, such as 1000 nm to 5000 nm. After step 54 of the method 10, the surface roughness ($R_a$) of the first primary surface 18 of the sheet of glass 12 is less than 500 nm, such as 50 nm to 500 nm, 50 nm to 250 nm, or 100 nm to 200 nm. Surface roughness ($R_a$) is the arithmetic average of the absolute values of the profile height deviations 102 from a mean line 104, recorded within the evaluation length 106 (see FIG. 5). In practice, the surface roughness ($R_a$) of the first primary surface 18 before step 54 (or in the absence of step 54) can be ascertained by separating a sheet of glass 12 from a portion of the ribbon of glass 16 that was not moved adjacent to the first raised temperature zone 56 (for example, the heat flux was deactivated), and then measuring the surface roughness ($R_a$) of that sheet of glass 12. The surface roughness ($R_a$) of the first primary surface 18 after step 54 can be ascertained by separating a sheet of glass 12 from a portion of the ribbon of glass 16 that was moved adjacent to the first raised temperature zone 56, and then measuring the surface roughness ($R_a$) of that sheet of glass 12.

In embodiments, before step 54 of the method 10 (or in the absence of steps 54 and 78), the ribbon of glass 16 and/or the sheet of glass 12 separated from the ribbon of glass 16 has a total thickness variation that is greater than or equal to 5 μm, such as 5 μm to 20 μm. In embodiments, by utilizing step 54 and step 78, the ribbon of glass 16 and the sheet of glass 12 separated from the ribbon of glass 16 has a total thickness variation that is less than 5 μm, such as 0.5 μm to 4.9 μm. As discussed, the ribbon of glass 16 can be formed with a less than desirable total thickness variation, because the less than desirable total thickness variation is carried through from the mold 34 and from chill wrinkles 52. The step 54 of the method 10 that passes the ribbon of glass 16 adjacent to the first raised temperature zone 56 and the step 78 that passes the ribbon of glass 16 adjacent to the second raised temperature zone 80, if included, reduces the total thickness variation of the ribbon of glass 16. Subsequent attenuation of the ribbon of glass 16 as the temperature at the core 50 rises and equilibrates with the temperature at the primary surfaces 18, 20 further reduces the total thickness variation of the ribbon of glass 16. The sheet of glass 12 separated from the ribbon of glass 16 at the step 96 thus has a desirable total thickness variation of less than 5 μm.

In embodiments, the sheet of glass 12 formed via the method 10 has a total thickness variation that is 50% or less (such as 10% to 50%) of a total thickness variation of the ribbon of glass 16 before step 54 (and step 78, if included) of the method 10. In embodiments, the sheet of glass 12 formed via the method 10 has a total thickness variation that is 50% or less (such as 10% to 50%) of a total thickness variation of the sheet of glass 12 formed via the method but without steps 54 and 78. For example, the ribbon of glass 16 might have a total thickness variation that is 8 μm before step 54 (and step 78 if included), and the sheet of glass 12 separated from the ribbon of glass 16 after step 54 and optionally step 78 has a total thickness variation of 4 μm or less.

In addition to providing reduced total thickness variation to the sheet of glass 12 than if steps 54, 78 did not occur, the steps 54, 78 improves the strength of sheets of glass 12. Scratches, pressure checks, and other surface defects present on the ribbon of glass 16 after formation would have carried through to the sheet of glass 12 separated therefrom but for the steps 54, 56 of the method 10. The steps 54, 78 reduce or eliminate such surface defects and thus result in a sheet of glass 12 with optimal strength.

The sheet of glass 12 has a width 108 between lateral edges 22, 24 carried through from the ribbon of glass 16. The sheet of glass 12 has a length 110, which is generally orthogonal to the lateral edges 22, 24, and parallel to the vertical portion of the ribbon of glass 16 from which the sheet of glass 12 is separated. Not all sheets of glass 12 separated from the ribbon glass 16 need to have the same width 108 or the same length 110. In embodiments, the width 108 of the sheet of glass 12 is 5 mm to 500 mm, while the length 110 is 5 mm to 500 mm. In other embodiments, the width 108 is wider than 500 mm and the length 110 is longer than 500 mm.

As mentioned above, the ribbon of glass 16 has a composition that is carried over to the sheet of glass 12. The method 10 is useful for any glass composition. In embodiments, the composition is such that the sheet of glass 12 separated from the ribbon of glass 16 has an index of refraction of 1.75 to 2.5 (at a temperature of 20° C. to 25° C. and for a wavelength of 589 nm to 633 nm). In other embodiments, the sheet of glass 12 has an index of refraction of 1.45 to 1.75. For example, a composition providing an index of refraction of 1.8 (at a wavelength of 633 nm) comprises (in mol %): 40.1 $SiO_2$, 11.3 $Li_2O$, 3.8 $ZrO_2$, 4.8 $Nb_2O_5$, 2.4 $B_2O_3$, 22.9 CaO, 5.4 $La_2O_3$, and 9.3 $TiO_2$. In wt %, the composition comprises: 28.5 $SiO_2$, 4.00 $Li_2O$, 5.5 $ZrO_2$, 15 $Nb_2O_5$, 2.0 $B_2O_3$, 15.2 CaO, 21 $La_2O_3$, and 8.8 $TiO_2$.

In some embodiments the glass composition comprises (in weight percentage, on an oxide basis, with the total weight percentage adding to 100%):

$SiO_2$, 5-55 wt %;
$ZrO_2$, 5-10 wt %;
CaO, 3.5-18 wt %;
$La_2O_3$, 0.2 wt % to 30 wt %;
$Nb_2O_5$, 0.5 wt % to 20 wt %;
$TiO_2$, 5-20 wt %;
$As_2O_3$, 0% to 0.2 wt %; and
$Er_2O_3$, 0.05% to 0.9 wt % (and preferably 0.1 to 0.9 wt %, for example, 0.1 to 0.8 wt %) and/or $Pr_2O_3$, 0.05% to 1 wt %; or $Nd_2O_3$, 0.05% to 1 wt %; or $Ho_2O_3$, 0.05% to 1 wt %; or Ce oxide ($CeO_2$), 0.05% to 1 wt %.

In embodiments, the glass composition comprises (in weight percentage, on an oxide basis, with the total weight percentage adding to 100%):

$SiO_2$, 5-60 wt %;
$ZrO_2$, 5-10 wt %;
CaO, 3.5-18 wt %;
$La_2O_3$, 0.2 wt % to 30 wt %;
$Nb_2O_5$, 0.5 wt % to 20 wt %;
$TiO_2$, 5-20 wt %;
$As_2O_3$, 0% to 0.2 wt %;
$Er_2O_3$, 0.01% to 0.5 wt % (e.g., 0.05 wt %-0.5 wt %, or 0.1 wt %-0.5 wt %);
$Na_2O$, 2-5 wt %;
$K_2O_5$, 0-9 wt %;
SrO, to 1 wt %;
BaO, 0-20 wt %;
F, 0-1 wt %; and
$B_2O_3$, 0-20 wt %.

Because pure silica has a refractive index of about 1.5, keeping the amount of $SiO_2$ at 55 wt % or below (e.g., 7 to 45 wt %) while adding higher index dopants allows the glass to be a high index glass of high clarity and no significant coloring. If the amount of $SiO_2$ is increased to above 60%, higher index dopants or constituents may need to be added, which may result in a colored, rather than clear, glass. According to some embodiments, the total amount of $Er_2O_3$, $Nd_2O_3$, $HO_2O_3$, Ce oxide, and $Pr_2O_3$ in the glass is less than 1.5 wt %, which helps to maintain clarity of the glass, and high transmissivity (transmission) at the desired wavelengths. As mentioned above, fusion processes are incompatible to form sheets of glass 12 from glass compositions that form relatively high index glass because the liquid viscosity of such compositions are too low.

In embodiments, the method 10 is a continuous process where molten glass 32 is delivered to the mold 34, the ribbon of glass 16 is formed and passed adjacent to the first raised temperature zone 56, the second raised temperature zone 80 (if included), and the plurality 98 of sheets of glass 12 are separated from the ribbon of glass 16 over a time period of numerous days, and even months or years without pause. In other embodiments, the method 10 is a discontinuous batch process, where a predetermined amount of molten glass 32 is delivered to the mold 34, and a limited length of ribbon of glass 16 is thus formed, from which a limited number of sheets of glass 12 can be separated.

Without steps 54 and 78 (if included) of the method 10 to reduce or eliminate surface defects and thereby provide a ribbon of glass 16 from which sheets of glass 12 with acceptable total thickness variation and surface roughness can be separated, the thickness variation of the sheets of glass 12 would have to be reduced via acid etching or mechanical grinding and polishing, or both. Those latter methods 10 are relatively expensive compared to steps 54 and 78 (if included) of the method 10. In addition, mechanical grinding and polishing to reduce surface defects and thickness variation of a sheet of glass 12 can be suboptimal because of the creation of glass dust and the creation of damage below the primary surfaces 18, 20 of the sheet of glass 12. Steps 54 and 78 (if included) of the process avoids such glass dust creation and does not create damage below the primary surfaces 18, 20 within the thickness 26. Further, steps 54 and 56 (if included) of the method 10 are inline processes performed before the sheets of glass 12 are separated from the ribbon of glass 16. In contrast, acid etching and mechanical grinding and polishing are typically not inline processes and require movement of the sheets of glass 12 to different stations. Each of step 54 and step 78 (if included) of the method 10 occur in less than 10 seconds, while acid etching can take many hours. Moreover, as mentioned above, the sheet of glass 12 can be made in a wide variety of sizes, including lengths 110 of 500 mm or more. Mechanical grinding and polishing wheels are not well adapted to grind and polish sheets of glass 12 of such size.

EXAMPLES

Figure 8:
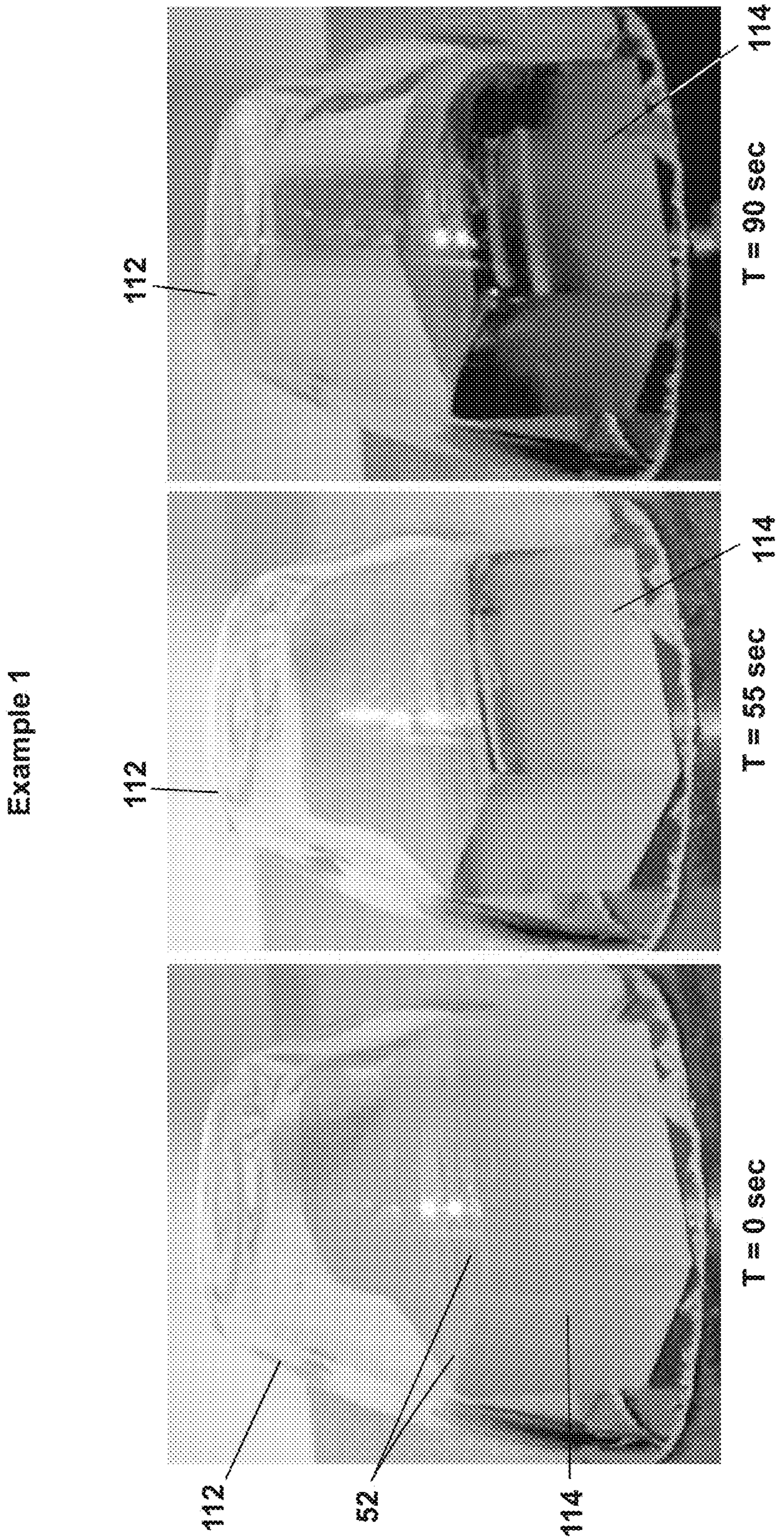
FIG. 8, pertaining to an Example 1, depicts a quartz crucible being heated by a flame and the quartz crucible heats an enclosed cube of glass via thermal radiation, and chill wrinkles present on a surface of the cube of glass at the beginning of the experiment ("T=0 sec") are eliminated within 90 seconds ("T=90 sec")

Example 1—In Example 1, as illustrated at FIG. 8, a quartz crucible 112 was inverted and placed over a cube of glass 114. The cube of glass 114 had chill wrinkles 52 at the top surface thereof. The cube of glass 114 had a composition similar to the composition described above comprising 28.5 weight percent $SiO_2$. The index of refraction of the composition of the glass is 1.8. At time t=0, no flame was being directed at the quartz crucible 112. However, after t=0 through 90 seconds (t=90 sec), a flame from an oxy-gas torch was directed at the quartz crucible 112, which resulted in the quartz crucible increasing in temperature. The heat from the quartz crucible 112 then radiated to the cube of glass 114. Within the 90 second period of time, the heat radiating from the quartz crucible 112 increased the temperature of the top surface of the cube of glass 114 sufficiently to liquefy the top surface and into a depth of the cube of glass 114, causing surface tension at the top surface to eliminate the chill wrinkles 52 that were previously there. The depiction of the cube of glass 114 at t=0 sec and t=55 sec (55 seconds) shows the chill wrinkles 52. The depiction of the cube of glass 114 at t=90 sec does not show the existence of chill wrinkles 52 but, rather, a smooth surface. The general cubic shape of the cube of glass 114 remained intact, which demonstrates that the radiative heating was capable of providing sufficient heat flux to the top surface of the cube of glass 114 to raise the temperature at the top surface sufficient to liquefy the top surface for a sufficient time to remove the chill wrinkles 52 without additionally heating the core of the cube of glass 114 to above the softening point of the composition.

Figure 9:
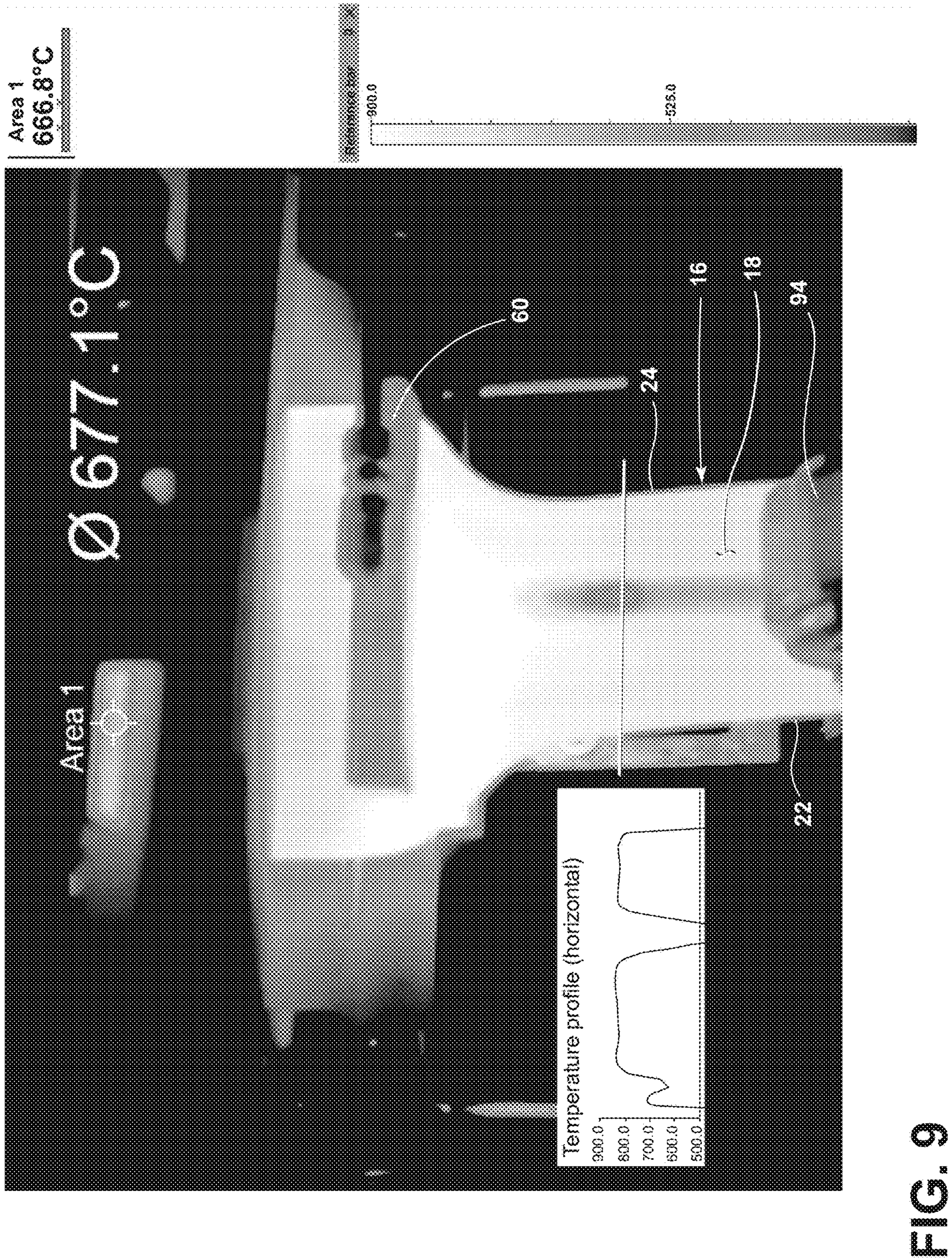
FIG. 9, pertaining to an Example 2, depicts infrared imagery of a ribbon of glass passing adjacent to a first raised temperature zone provided by a horizontally oriented line burner according to an embodiment of the method of FIG. 1, illustrating the ribbon of glass attenuating moving downwards as temperatures of the first primary surface and the core of the ribbon of glass equilibrate and the effective viscosity of the ribbon of glass decreases.

Example 2—In Example 2, molten glass having a composition that was the same as the composition of the cube of glass of Example 1 was delivered to the nip between a pair of forming rollers. The surfaces of the pair of forming rollers contacting the glass had an elevated temperature. The pair of forming rollers were set to rotate at 0.25 meters per minute. After the pair of forming rollers formed the ribbon of glass from the delivered molten glass, a horizontally oriented flame burner directed a flame at the first primary surface of the ribbon of glass throughout a first raised temperature zone. The horizontally oriented flame burner was centrally disposed across the ribbon of glass and had a width narrower than the width of the ribbon of glass facing the flame burner. The second primary surface of the ribbon of glass was left unheated—that is, there was no second raised temperature zone. A single pair of centrally located pulling rollers pulled the ribbon of glass downward, further attenuating the ribbon of glass after passing adjacent to the flame burner. Infrared measurements of the temperature of the ribbon of glass is reproduced at FIG. 9.

Figure 10:
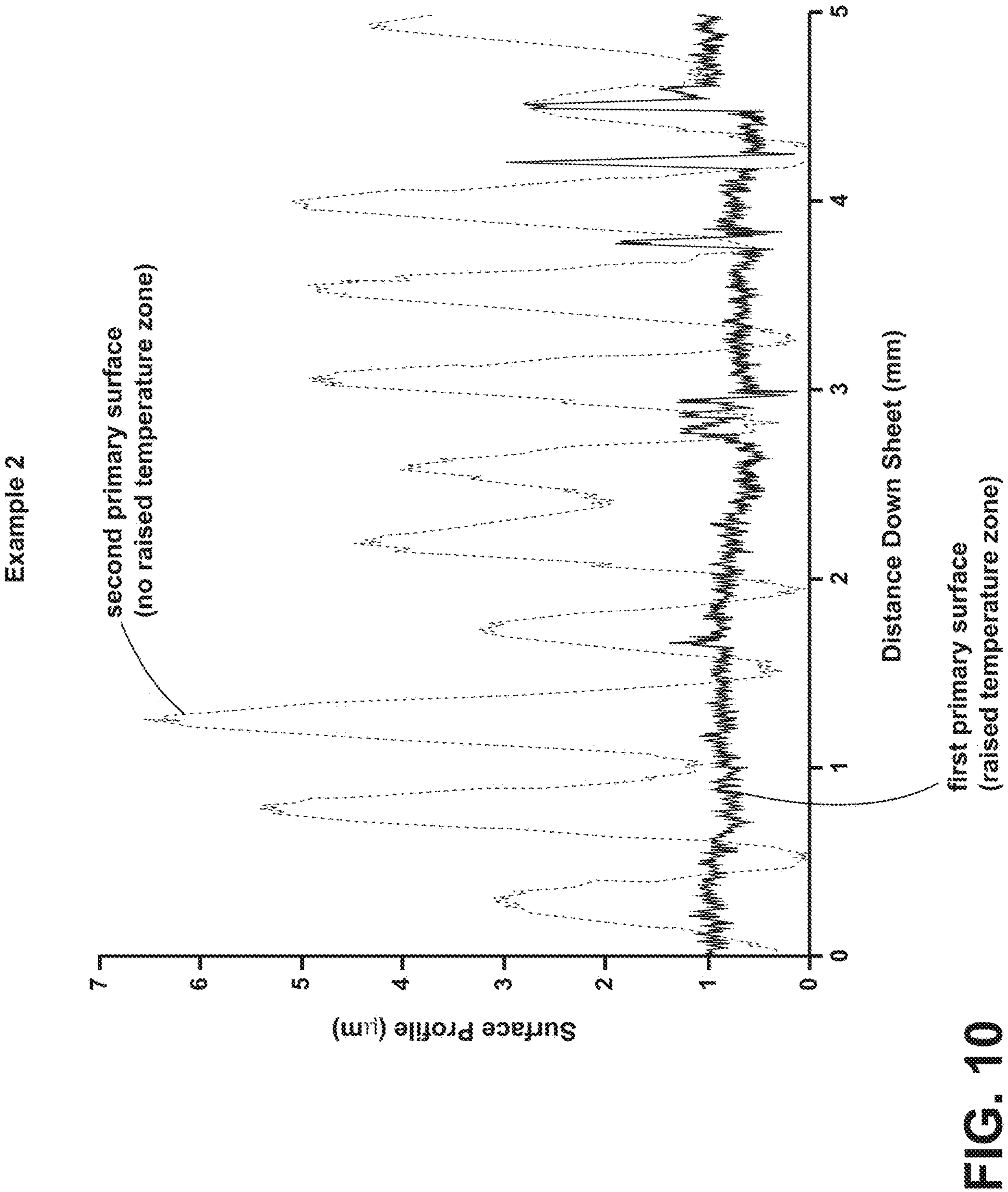
FIG. 10, also pertaining to Example 2, graphically reproduces surface profile measurements taken of a sheet of glass separated from the ribbon of glass of FIG. 9, illustrating that the first primary surface of the sheet of glass that had passed adjacent to the first raised temperature zone while part of the ribbon of glass had a narrower surface profile than the second primary surface of the sheet of glass that had not passed adjacent to a raised temperature zone while part of the ribbon of glass.

A sheet of glass was separated from the ribbon of glass. A coordinate measurement machine was utilized to measure the surface profile of both the first primary surface that passed adjacent to the first raised temperature zone, and the second primary surface that did not pass adjacent to any such raised temperature zone. The measurement results are graphically reproduced at FIG. 10. The "Distance Down Sheet (mm)" means the distance along the length of the sheet of glass. The results pertaining to the second primary surface reveal repeating undulations in surface height that were likely chill wrinkles. Some of the peaks in height approached 7 μm and most were in the range of 3 μm to 5 μm. In contrast, the results pertaining to the first primary surface that passed adjacent to the flame burner illustrate a more constant surface profile of about 1 μm or just less. The elevations in surface profile between 4 mm and 5 mm down the sheet are likely due to a dust particle that landed upon the ribbon of glass during separation of a previous sheet of glass.

Figure 11:
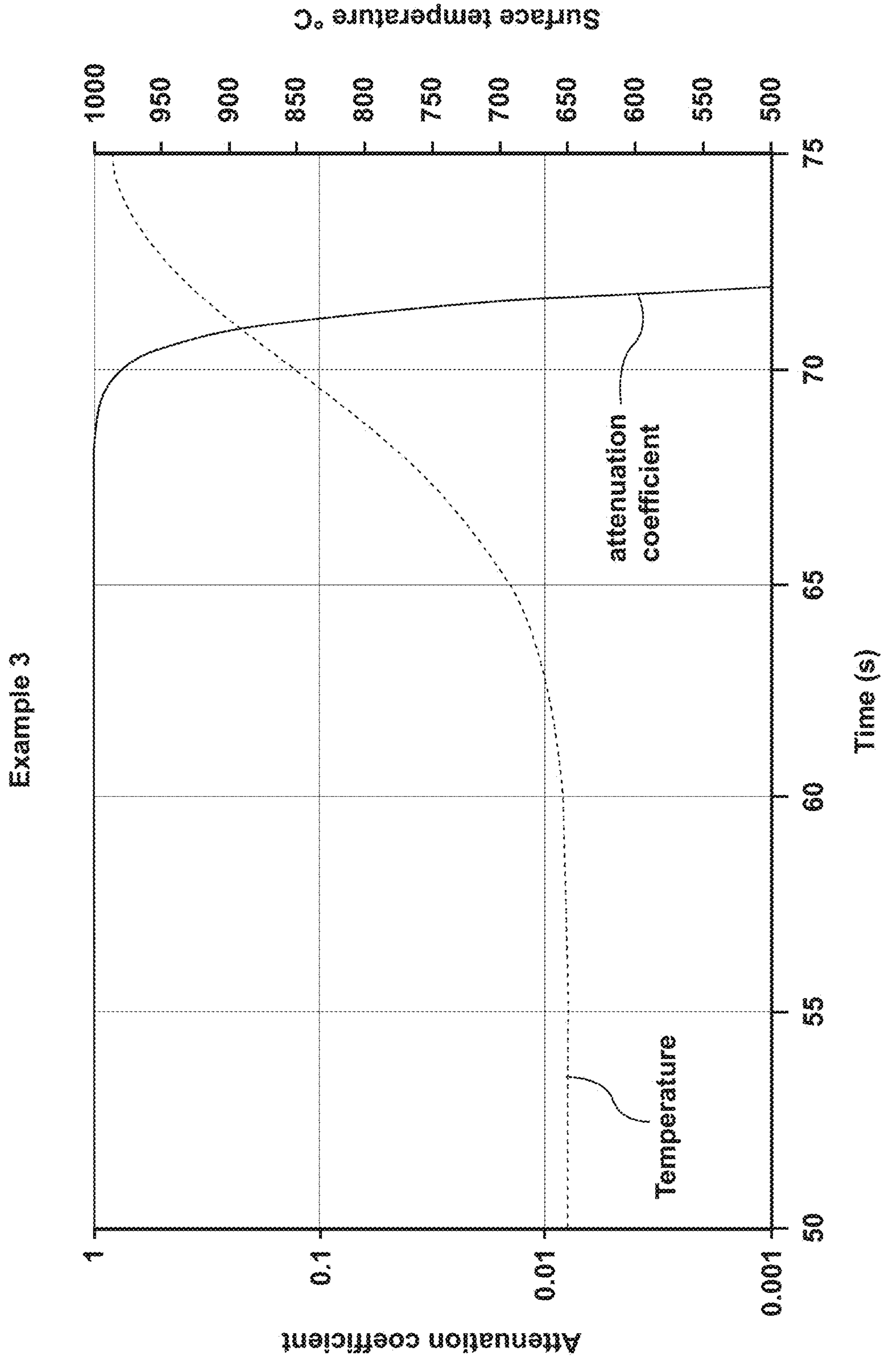
FIG. 11 is a graph pertaining to a computer model Example 3, and illustrates that the temperature of the first primary surface of the ribbon of glass can rise to at least a temperature sufficient to liquefy the first primary surface seconds before the attenuation coefficient of the ribbon of glass begins to decrease, conveying the principle that there is sufficient time for surface tension, while the first primary surface is liquefied, to reduce surface defects and total thickness variation before the effective viscosity of the ribbon of glass decreases sufficiently for the ribbon of glass to attenuate.

Example 3—Example 3 is computer modeling. The modeling assumed: (1) flow of 60 lbs/hr and the ribbon of glass having a width of 150 mm; (2) that the ribbon of glass loses heat via convection with a heat transfer coefficient of 5 $W/(m^2 \cdot K)$ and via radiation with an emissivity of 0.4; (3) gray-body approximation and no radiation in participating media; (4) a prescribed ambient temperature of 650° C. to 20° C.; (5) that the viscosity of the ribbon of glass as a function of temperature followed the Vogel-Fulcher-Tammann-Hesse viscosity formula $$\mu = 10^{A+\frac{B}{T-T_0}},$$

where μ is in Poise, A=−5.75, B=5601.9, $T_0$=312.3, and T is the temperature of the ribbon of glass in ° C., (6) the ribbon of glass having a thermal conductivity of 1.0 W/(m·K); (6) the heat flux from the virtual first raised temperature zone having a Gaussian distribution and a baseline power density of $3*10^5$ $W/m^2$; and (7) a semi-width at 1/e level of 15 mm. The model considered the change in the temperature of the first primary surface of the ribbon of glass and the attenuation coefficient of the ribbon of glass as a function a time. The attenuation coefficient is the ratio of the thickness of the ribbon of glass at a particular time to the starting thickness of the ribbon of glass. The results of the model are graphically reproduced at FIGS. 11 and 12. The graph of FIG. 11 illustrates that the temperature of the first primary surface can rise significantly and sufficiently to liquefy the first primary surface before the ribbon of glass begins to attenuate—that is, before the attenuation coefficient begins to fall. This period of time, albeit a matter of seconds, allows surface tension at the first primary surface to reduce or eliminate surface defects before the ribbon of glass begins to attenuate.

Figure 12:
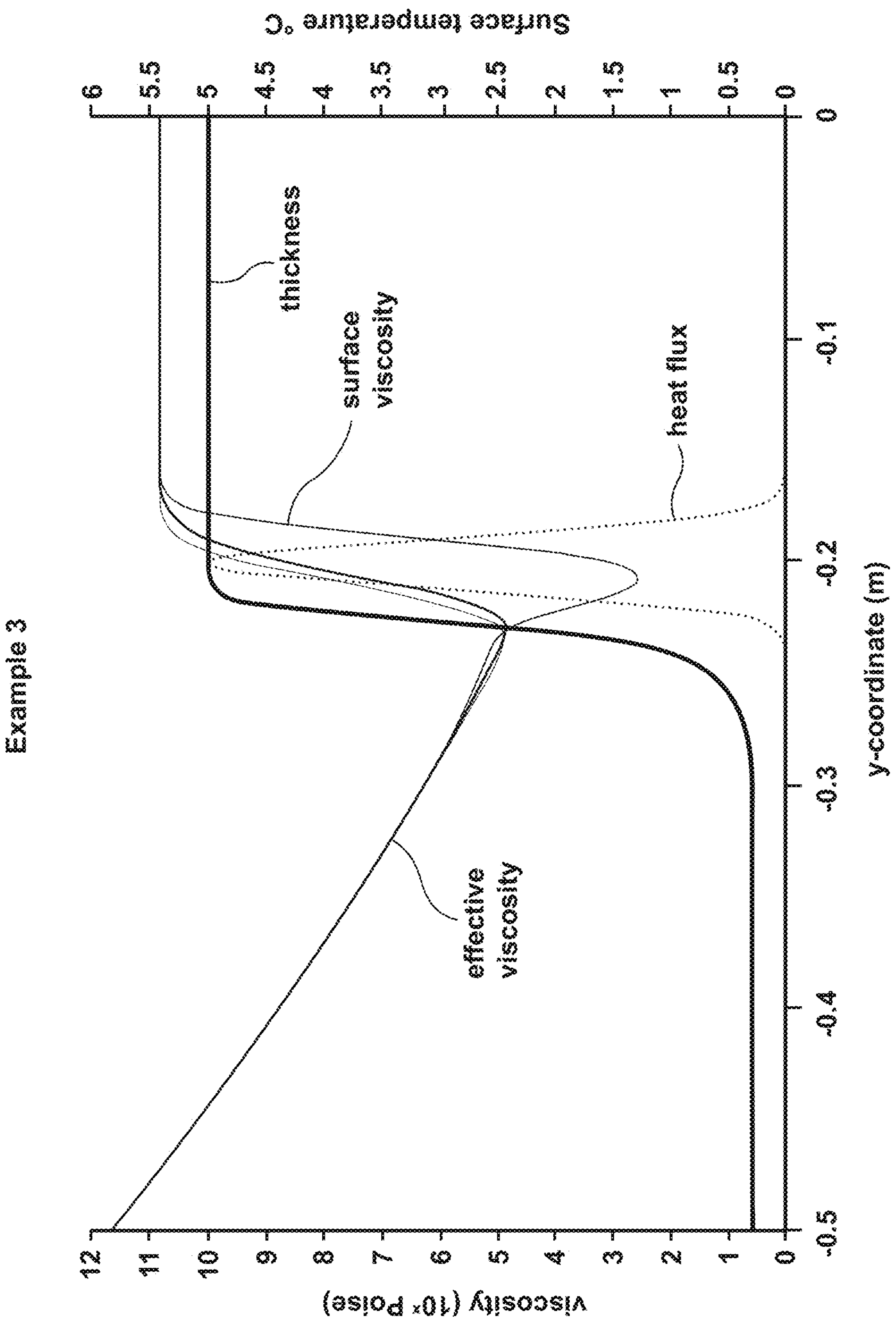
FIG. 12, also pertaining to Example 3, illustrates a heat flux causing the viscosity at the first primary surface to fall below 1000 Poise (i.e., $10^3$ Poise), which is sufficiently low for surface tension to reduce surface defects and total thickness variation, before the thickness of the ribbon of glass appreciably decreases due to a decrease of the effective viscosity of the ribbon of glass as a whole.

The graph of FIG. 12 illustrates that the viscosity of the heated first primary surface of the ribbon of glass falls from approximately 10" Poise to under 1000 Poise ($10^3$ Poise) before the effective viscosity of the ribbon of glass falls sufficiently for the ribbon of glass to attenuate (that is, before the value starts decreasing from 5 mm). This aspect allows the lowered viscosity of the first primary surface to remove surface defects through surface tension before attenuation begins. The amount of time where the heat flux is applied to the first primary surface is sufficient to lower the viscosity at the surface to under 1000 Poise but insufficient to cause devitrification or allow the core of the ribbon of glass to heat to a similarly low viscosity via conduction and radiation.

Figure 13A:
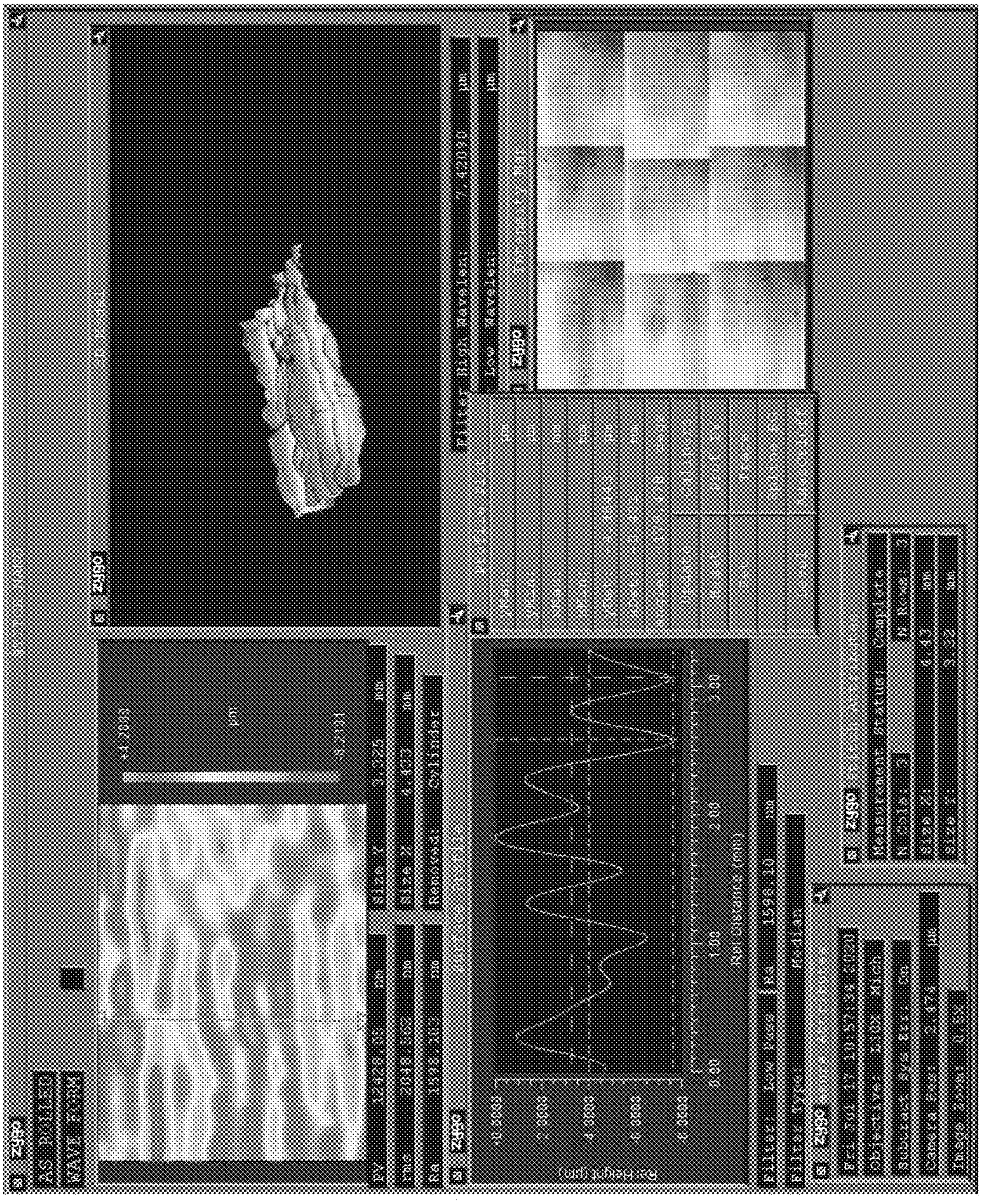
FIG. 13A, pertaining to a Comparative Example 4A, illustrates surface roughness ($R_a$) and surface profile measurements for a sheet of glass separated from a ribbon of glass that did not pass adjacent to a first raised temperature zone before separation of the ribbon of glass.
Figure 13B:
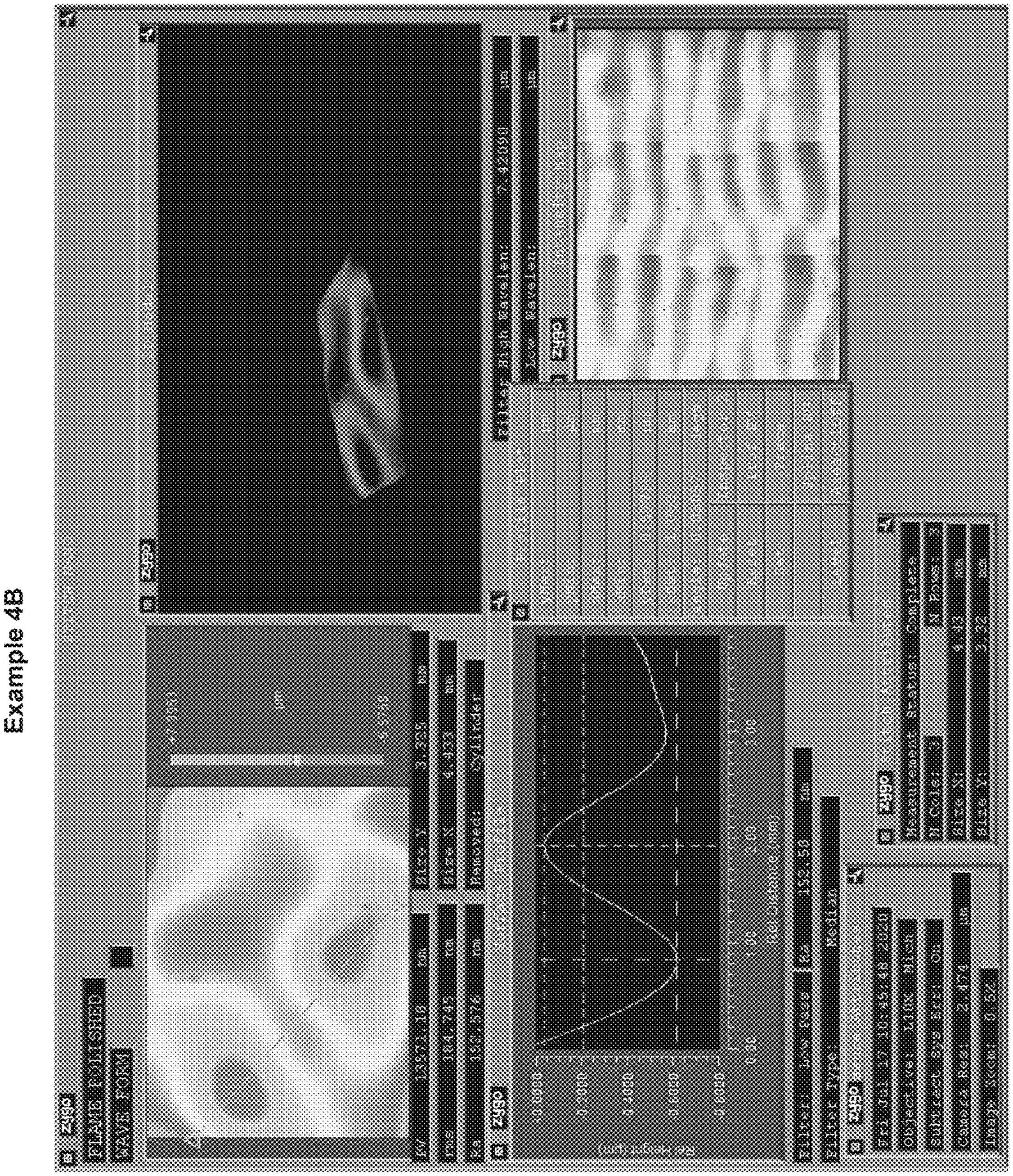
FIG. 13B, pertaining to an Example 4B, illustrates surface roughness ($R_a$) and surface profile measurements for a sheet of glass separated from a ribbon of glass that passed adjacent to a first raised temperature zone sufficient to liquefy the first primary surface of the ribbon of glass before separation of the ribbon of glass.

Comparative Example 4A and Example 4B—In Example 4B, a sheet of glass was formed pursuant to the method described above, with a first raised temperature zone raising the temperature at the first primary surface of the ribbon of glass sufficiently to liquefy the ribbon of glass. A sheet of glass was then separated from the ribbon of glass. In Comparative Example 4A, no such first raised temperature zone was utilized before separating a sheet of glass. The composition of the glass for both Comparative Example 4A and Example 4B was similar to the composition described above resulting in an index of refraction of 1.8. The surface roughness ($R_a$) for both sheets of glass was then measured. As set forth in the print screen at FIG. 13A, the surface roughness ($R_a$) for the sheet of glass for Comparative Example 4A was 1598 nm. In contrast, as set forth in the print screen at FIG. 13B, the surface roughness ($R_a$) for the sheet of glass for Example 4B was 152 nm, a reduction of over 90 percent ((1598−152)/1598=0.905*100%=90.5%). The surface roughness (rms) values additionally significantly decreased from 2049 nm to 185 nm.

What is claimed is:

1. A method of manufacturing a sheet of glass comprising:

a delivering step comprising delivering molten glass to a mold;

(a) with the mold, forming the molten glass into a vertically oriented ribbon of glass that moves downward as a function of time, the ribbon of glass having a first primary surface and a second primary surface that face in generally opposite directions and a core disposed between the first and second primary surfaces;

(b) as the ribbon of glass moves downward, passing the ribbon of glass adjacent to a first raised temperature zone that lowers a viscosity of the first primary surface sufficiently so that surface tension at the first primary surface reduces a total thickness variation of the ribbon of glass while a temperature of the core remains sufficiently low to prevent attenuation of the ribbon of glass, the first raised temperature zone having a substantially fixed vertical position; and (c) after the ribbon of glass moves below the first raised temperature zone, separating a sheet of glass from the ribbon of glass, wherein between (b) and (c), and after the total thickness variation has decreased and after the ribbon of glass has moved downward past the first raised temperature zone, the temperature of the first primary surface and the temperature of the core move closer to equilibrium and an effective viscosity of the ribbon of glass decreases such that the ribbon of glass then attenuates.

2. The method of claim 1, wherein the molten glass from which the ribbon of glass was formed is of a single glass composition.

3. The method of claim 1, wherein the delivering step comprises delivering the molten glass to a nip between a pair of opposing forming rollers, the pair of opposing forming rollers being the mold;

wherein, forming the vertically oriented ribbon of glass comprises rotating the pair of forming rollers to roll the molten glass delivered to the nip into the ribbon of glass.

4. The method of claim 1 further comprising:

after (b) and before (c), pulling the ribbon of glass downward with pulling rollers.

5. The method of claim 4, wherein pulling the ribbon of glass with pulling rollers assists in the attenuation of the ribbon of glass.

6. The method of claim 1 further comprising:

after (b) and before (c), measuring a thickness of the ribbon of glass between the first primary surface and the second primary surface.

7. The method of claim 1, wherein the first primary surface of the separated sheet of glass has a surface roughness ($R_a$) less than 500 nm.

8. The method of claim 1, wherein the sheet of glass separated from the ribbon of glass has a total thickness variation that is less than 5 μm.

9. The method of claim 1, wherein the sheet of glass separated from the ribbon of glass has a total thickness variation that is 50% or less than a total thickness variation of the ribbon of glass before step (b).

10. The method of claim 1, wherein the ribbon of glass after (a) but before (b) has a thickness between the first primary surface and the second primary surface that is 3 mm to 5 mm.

11. The method of claim 1, wherein the ribbon of glass after (b) has a thickness between the first primary surface and the second primary surface that is at least 1.5 mm.

12. The method of claim 1, wherein the attenuation of the ribbon of glass between (b) and (c) reduces a thickness of the ribbon of glass between the first primary surface and the second primary surface as well as a width of the ribbon of glass.

13. The method of claim 1, wherein the lowering of the viscosity of the first primary surface during (b) comprises directing a flame at the first primary surface.

14. The method of claim 13, wherein a horizontally oriented line burner directs the flame at the first primary surface; and the horizontally oriented line burner has a horizontal width that is narrower than a horizontal width of the ribbon of glass facing the horizontally oriented line burner.

15. The method of claim 1, wherein the lowering of the viscosity of the first primary surface during (b) comprises facing the first primary surface at a hot body that transfers heat to the first primary surface primarily via thermal radiation.

16. The method of claim 1, wherein step (b) reduces devitrification within the ribbon of glass.

17. The method of claim 1, wherein
before (b), the ribbon of glass has a viscosity within a range of from $10^{10}$ Poise to $10^{12}$ Poise;
during (b), the viscosity of the ribbon of glass at the first primary surface is reduced to $10^5$ Poise or less into a depth of at least 100 μm into a thickness of the ribbon of glass from the first primary surface; and
before (c), the viscosity of the ribbon of glass rises to within a range of from $10^6$ Poise to $10^8$ Poise.

18. The method of claim 1, wherein
(b) occurs within a time period within a range of from 1 second to 10 seconds.

19. The method of claim 1, wherein
the sheet of glass has an index of refraction, at a temperature within a range of from 20° C. to 25° C. and for a wavelength within a range of from 589 nm to 633 nm, that is within a range of from 1.75 to 2.5.

20. A method of manufacturing a sheet of glass comprising:
(a) forming, from molten glass, a vertically oriented ribbon of glass that moves downward as a function of time, the ribbon of glass having a first primary surface and a second primary surface that face in generally opposite directions and a core disposed between the first and second primary surfaces;
(b) as the ribbon of glass moves downward, passing the ribbon of glass adjacent to (i) a first raised temperature zone that applies a heat flux to the first primary surface that lowers a viscosity of the first primary surface sufficiently so that surface tension at the first primary surface reduces a total thickness variation of the ribbon of glass while a temperature of the core remains sufficiently low to prevent attenuation of the ribbon of glass and (ii) a second raised temperature zone that lowers a viscosity of the second primary surface so that surface tension at the second primary surface further reduces the total thickness variation of the ribbon of glass while the temperature of the core remains sufficiently low to prevent attenuation of the ribbon of glass; and
(c) after the ribbon of glass moves below the first raised temperature zone and the second raised temperature zone, separating a sheet of glass from the ribbon of glass, wherein;
between (b) and (c) and after the total thickness variation of the ribbon of glass has decreased, the temperatures of the first primary surface, the second primary surface, and the core move closer to equilibrium, an effective viscosity of the ribbon of glass decreases such that the ribbon of glass then attenuates.

21. The method of claim 20, wherein
the first raised temperature zone and the second raised temperature zone are vertically staggered.

22. The method of claim 20, wherein
the first raised temperature zone and the second raised temperature zone both overlap a horizontal plane.

23. The method of claim 20, wherein
the ribbon of glass was formed from molten glass of a single glass composition.

24. The method of claim 20, wherein
the attenuation of the ribbon of glass between (b) and (c) reduces a thickness of the ribbon of glass as well as a width of the ribbon of glass.

25. A method of manufacturing a sheet of glass comprising:
(a) delivering molten glass as a stream to a nip between a pair of forming rollers, the molten glass delivered forming a puddle of the molten glass on the pair of forming rollers;
(b) rotating the pair of forming rollers to roll the molten glass delivered to the nip into a vertically oriented ribbon of glass that moves downward as a function of time, the ribbon of glass having a first primary surface and a second primary surface that face in generally opposite directions and a core disposed between the first and second primary surfaces;
(c) as the ribbon of glass moves downward, passing the ribbon of glass adjacent to a first raised temperature zone that raises a temperature of the first primary surface, without physically contacting the ribbon of glass, sufficiently so that surface tension at the first primary surface reduces a total thickness variation of the ribbon of glass while a temperature of the core is sufficiently low to prevent attenuation of the ribbon of glass;
(d) after the total thickness variation has decreased, the temperature of the first primary surface and the temperature of the core move closer to equilibrium and an effective viscosity of the ribbon of glass decreases such that the ribbon of glass attenuates;
(e) a pulling step comprising pulling the ribbon of glass downward with pulling rollers, the pulling rollers disposed lower than the first raised temperature zone; and
(f) after the pulling step, separating a sheet of glass from the ribbon of glass.

26. The method of claim 25, wherein
the molten glass exhibits a liquidus viscosity within a range of from 1 Poise to 100 Poise.

27. The method of claim 25, wherein
during (a), the molten glass is delivered to the nip at a glass temperature of about 1000° C. or higher;
after (a) and before (c), the ribbon of glass solidifies;
during (c), the ribbon of glass has a viscosity from the first primary surface to a depth of at least 100 μm that is $10^5$ Poise or less; and
while the ribbon of glass attenuates during (d), the effective viscosity of the ribbon of glass is within a range of from $10^6$ to $10^8$ Poise, and a thickness and a width of the ribbon of glass decrease.

28. The method of claim 25, wherein
the sheet of glass has an index of refraction within a range of from 1.75 to 2.5.

29. The method of claim 25, wherein
the molten glass comprises a single composition comprising
from 5 wt % to 60 wt % $SiO_2$,
from 0.5 wt % to 20 wt % $Nb_2O_5$,
from 0.2 wt % to 30 wt % $La_2O_3$, and
from 5 wt % to 20 wt % $TiO_2$.

30. The method of claim 25, wherein
the molten glass from which the ribbon of glass was formed is from a single source of molten glass.

* * * * *